United States Patent
Vanrompay et al.

(10) Patent No.: US 12,553,841 B2
(45) Date of Patent: Feb. 17, 2026

(54) DEEP LEARNING TECHNIQUES FOR FAST ANOMALY DETECTION IN EXPERIMENTAL DATA

(71) Applicant: FEI COMPANY, Hillsboro, OR (US)

(72) Inventors: Hans Vanrompay, Hillsboro, OR (US); Maurice Peemen, Hillsboro, OR (US)

(73) Assignee: FEI Company, Hillsboro, OR (US)

( * ) Notice: Subject to any disclaimer, the term of this patent is extended or adjusted under 35 U.S.C. 154(b) by 412 days.

(21) Appl. No.: 18/171,541

(22) Filed: Feb. 20, 2023

(65) Prior Publication Data

US 2024/0280522 A1    Aug. 22, 2024

(51) Int. Cl.
*H01J 37/28* (2006.01)
*G01N 23/2252* (2018.01)
*G06N 3/0455* (2023.01)

(52) U.S. Cl.
CPC ....... *G01N 23/2252* (2013.01); *G06N 3/0455* (2023.01); *H01J 37/28* (2013.01)

(58) Field of Classification Search
CPC ......... G01N 2223/053; G01N 2223/07; G01N 2223/071; G01N 2223/079; G01N 2223/0563; G01N 2223/054; G01N 2223/052; G01N 2223/03; G01N 23/2252; G01N 23/2251; G06T 2207/10056; G06T 2207/10061; H01J 2237/2817; H01J 37/222; H01J 37/28; H01J 2237/2802; G06N 3/0455; G06N 3/08

See application file for complete search history.

(56) References Cited

U.S. PATENT DOCUMENTS 11,373,839 B1 * 6/2022 Hlavenka .............. H01J 37/244
11,815,479 B2 * 11/2023 Kaplenko .......... G01N 23/2206
(Continued)

OTHER PUBLICATIONS

Ziatdinov, Maxim, et al. "AtomAI: a deep learning framework for analysis of image and spectroscopy data in (scanning) transmission electron microscopy and beyond." arXiv preprint arXiv:2105.07485 (2021). (Year: 2021).*

(Continued)

*Primary Examiner* — Wyatt A Stoffa
(74) *Attorney, Agent, or Firm* — Leron Vandsburger

(57) ABSTRACT

Disclosed herein are scientific instrument support systems, as well as related methods, apparatus, computing devices, and computer-readable media. Some embodiments provide a scientific instrument including detectors supporting one or more spectroscopic modalities and an imaging modality and further including an electronic controller configured to process streams of measurements received from the detectors. The electronic controller operates to generate a base image of the sample based on the measurements corresponding to the imaging modality and further operates to generate an anomaly map of the sample based on the base image and further based on differences between measured and autoencoder-reconstructed spectra corresponding to different pixels of the base image. In at least some instances, the anomaly map can beneficially be used in a quality-control procedure to identify, within seconds, specific problem spots in the sample for more-detailed inspection and/or analyses.

20 Claims, 18 Drawing Sheets
(6 of 18 Drawing Sheet(s) Filed in Color)

(56) References Cited

U.S. PATENT DOCUMENTS

| | | | | |
|---|---|---|---|---|
| 2022/0065804 | A1* | 3/2022 | Kaplenko | H01J 37/222 |
| 2022/0207893 | A1* | 6/2022 | Kocár | G06T 7/11 |
| 2023/0003675 | A1* | 1/2023 | Kaplenko | G01N 23/083 |
| 2023/0019371 | A1* | 1/2023 | Fukuda | G06T 7/0004 |
| 2023/0122101 | A1* | 4/2023 | Kim | G06V 10/763 |
| | | | | 250/307 |
| 2023/0355456 | A1* | 11/2023 | Schmitt | A61G 7/08 |
| 2024/0085356 | A1* | 3/2024 | Girmonsky | G01N 23/2252 |
| 2025/0104210 | A1* | 3/2025 | Pu | G03F 7/706841 |

OTHER PUBLICATIONS

K. M. Roccapriore, M. Ziatdinov, S. H. Cho, J. A. Hachtel, S. V. Kalinin, Predictability of Localized Plasmonic Responses in Nanoparticle Assemblies. Small 2021, 17, 2100181. https://doi.org/10.1002/smll.202100181 (Year: 2021).*

Kalinin, Sergei V., et al. "Toward decoding the relationship between domain structure and functionality in ferroelectrics via hidden latent variables." ACS Applied Materials & Interfaces 13.1 (2021): 1693-1703 (Year: 2021).*

Anonymous, "Hierarchical Multimodal Variational Autoencoders," ICLR, 2022, 25 pages.

Belwalkar et al., "Spectral-Spatial Classification of Hyperspectral Remote Sensing Images Using Variational Autoencoder and Convolution Neural Network," Int. Arch. Photogramm. Remote Sens. Spatial Inf. Sci., 2018, vol. XLII-5: 613-620.

github.com, "Gaussian Mixture Variational Autoencoder," <https://github.com/jariasf/GMVAE> webpage publicly available since Sep. 14, 2020.

github.com, "Multimodal Mixture-of-Experts VAE," <https://github.com/iffsid/mmvae> webpage publicaly available since Oct. 16, 2020.

Grossutti et al., "Deep Learning and Infrared Spectroscopy: Representation Learning with a β-Variational Autoencoder," J. Phys. Chem. Lett., 2022, 13(25): 5787-5793.

He et al., "Accurate Tumor Subtype Detection with Raman Spectroscopy via Variational Autoencoder and Machine Learning," ACS Omega, 2022, 2(12): 10458-10468.

Higgins et al., "β-Learning Basic Visual Concepts with a Constrained Variational Framework," Published as a conference paper at ICLR, 2017, 22 pages.

Jia et al., "A Survey: Deep Learning for Hyperspectral Image Classification with Few Labeled Samples," arXiv:2112.01800v1, Dec. 3, 2021, 54 pages.

Jiang et al., "Variational Deep Embedding: An Unsupervised and Generative Approach to Clustering," arXiv:1611.05148v3, Jun. 29, 2017, 22 pages.

Kalinin et al., "Machine learning in scanning transmission electron microscopy," Nature Reviews Methods Primers, 2022, 2: 11.

Kalinin et al., "Separating Physically Distinct Mechanisms in Complex Infrared Plasmonic Nanostructures via Machine Learning Enhanced Electron Energy Loss Spectroscopy," Adv. Optical Mater, 2021, 2001808, 13 pages.

Kalinin et al., "Separating physically distinct mechanisms in complex infrared plasmonic nanostructures via machine learning enhanced electron energy loss spectroscopy," arXiv:2009.08501, Sep. 17, 2020, 29 pages.

Kopf et al., "Mixture-of-Experts Variational Autoencoder for Clustering and Generating from Similarity-Based Representations on Single Cell Data," arXiv:1910.07763v3, Dec. 21, 2020, 30 pages.

Kutuzova et al., "Multimodal Variational Autoencoders for Semi-Supervised Learning: In Defense of Product-of-Experts," arXiv:2102.07240, Jul. 30, 2021, 29 pages.

Lee et al., "Private-Shared Disentangled Multimodal VAE for Learning of Hybrid Latent Representations," arXiv:2012.13024v1, Dec. 23, 2020, 20 pages.

Li et al., "Spectral-Spatial Classification of Hyperspectral Imagery with 3D Convolutional Neural Network," Remote Sens., 2017, 9(1): 67.

Li et al., "Variational Generative Adversarial Network with Crossed Spatial and Spectral Interactions for Hyperspectral Image Classification," Remote Sens., 2021, 13:3131.

Mei et al., "Unsupervised Spatial-Spectral Feature Learning by 3D Convolutional Autoencoder for Hyperspectral Classification," IEEE Transactions on Geoscience and Remote Sensing, 2019, 57(9): 6808-6820.

Mondal et al., "SSDMM-VAE: variational multi-modal disentangled representation learning," Applied Intelligence, 2022, 53: 8467-8481.

Nalepa et al., "Unsupervised Segmentation of Hyperspectral Images Using 3D Convolutional Autoencoders," arXiv:1907.08870v1, Jul. 20, 2019, 5 pages.

Pate et al., "RapidEELS: machine learning for denoising and classifcation in rapid acquisition electron energy loss spectroscopy," Scientific Reports, 2021, 11:19515.

Piechocki et al., "Multimodal sensor fusion in the latent representation space," arXiv:2208.02183v1, Aug. 3, 2022, 20 pages.

Portillo et al., "Dimensionality Reduction of SDSS Spectra with Variational Autoencoders," The Astronomical Journal, 2020, 160: 45, 17 pages.

Roy et al., "HybridSN: Exploring 3-D-2-D CNN Feature Hierarchy for Hyperspectral Image Classification," IEEE Geoscience and Remote Sensing Letters, 2020, 17(2): 277-281.

Ryu et al., "Dimensional reduction and unsupervised clustering for EELS-SI," Ultramicroscopy, 2021, 10 pages.

Shi et al., "Variational Autoencoders for Hyperspectral Unmixing with Endmember Variability," ICASSP 2021—2021 IEEE International Conference on Acoustics, Speech and Signal Processing (ICASSP), Oct. 21, 2021.

Shi et al., "Variational Mixture-of-Experts Autoencoders for Multi-Modal Deep Generative Models," arXiv:1911.03393v1, Nov. 8, 2019, 19 pages.

Suzuki et al., "Joint Multimodal Learning with Deep Generative Models," arXiv:1611.01891, Nov. 7, 2016, 12 pages.

Wang et al., "A review of deep learning used in the hyperspectral image analysis for agriculture," Artificial Intelligence Review, 2021, 54: 5205-5253.

Wu et al., "Multimodal Generative Models for Scalable Weakly-Supervised Learning," arXiv:1802.05335, Nov. 12, 2018, 19 pages.

Xu et al., "Multi-VAE: Learning Disentangled View-Common and View-Peculiar Visual Representations for Multi-View Clustering," ICCV, 2021, 10 pages.

Yang et al., "Hyperspectral image classification using two-channel deep convolutional neural network," Conference Paper, 2016, 4 pages.

Zhai et al., "Hyperspectral Image Clustering,: Current Achievements and Future Lines," IEEE Geoscience and Remote Sensing Magazine, 2021, 33 pages.

Zhang et al., "Spectral-spatial classification of hyperspectral imagery using a dual-channel convolutional neural network," Remote Sensing Letters, 2017, 8(5): 438-447.

Zhao et al., "A 3D-CNN Framework for Hyperspectral Unmixing with Spectral Variability," IEEE Transactions on Geoscience and Remote Sensing, 2022, 14 pages.

* cited by examiner

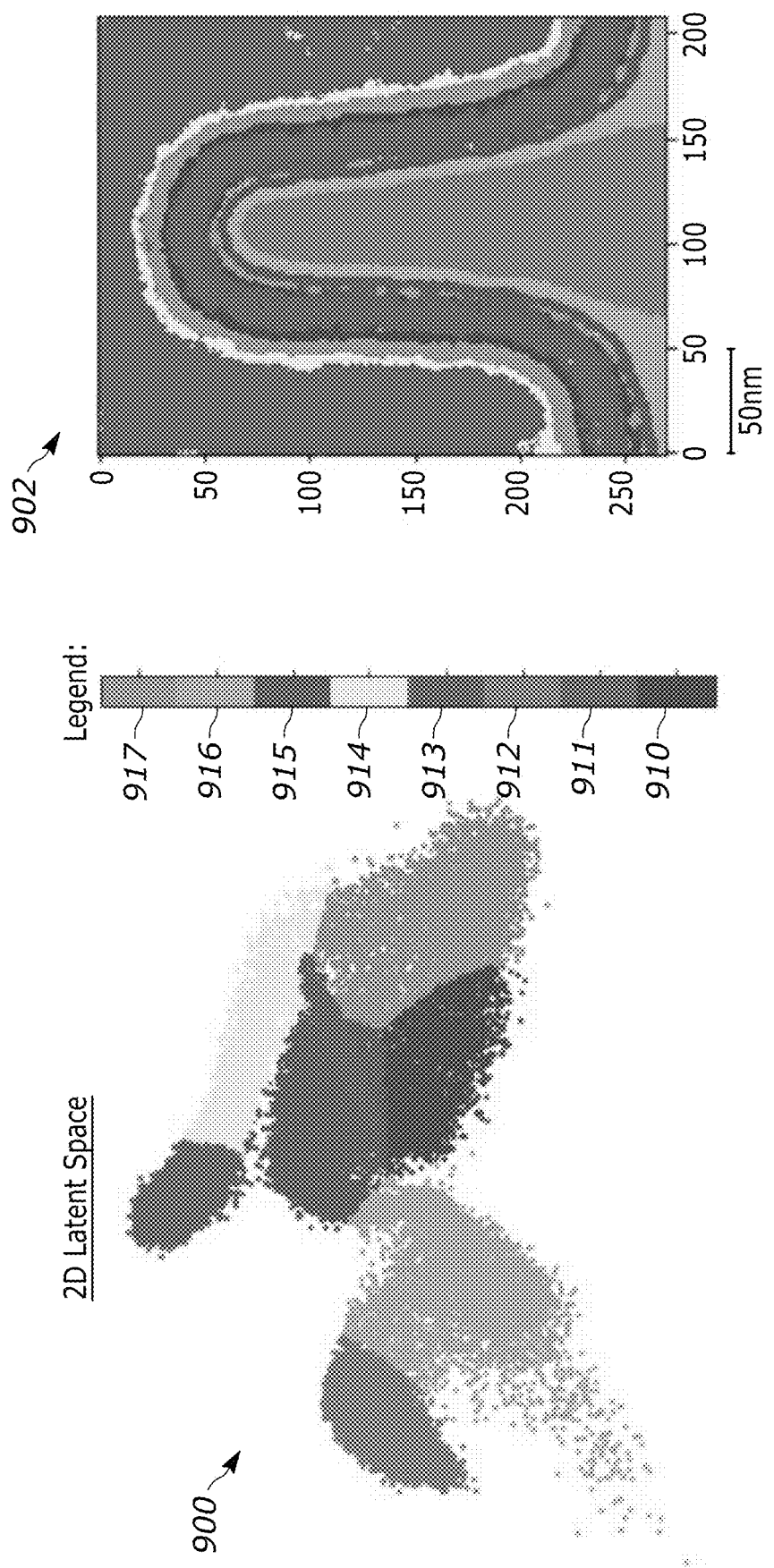

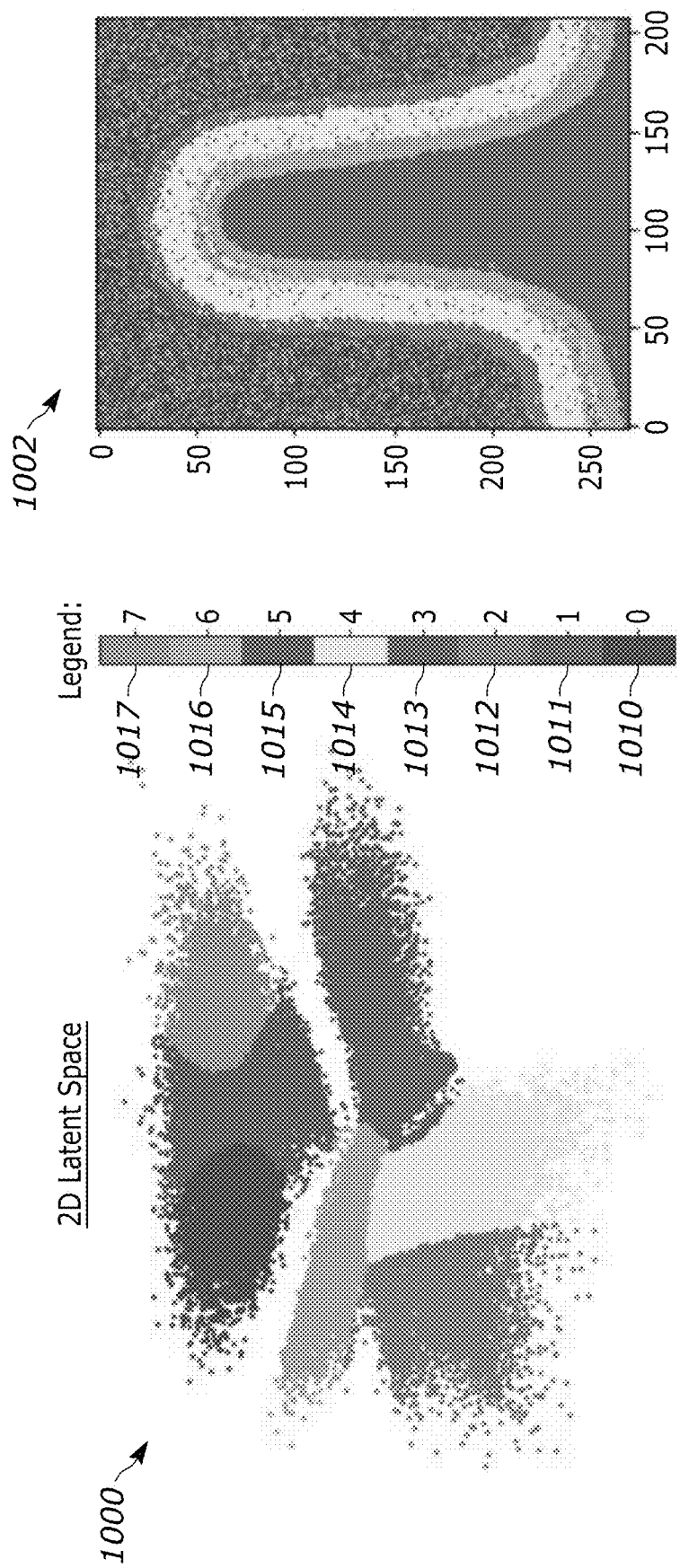

DEEP LEARNING TECHNIQUES FOR FAST ANOMALY DETECTION IN EXPERIMENTAL DATA

TECHNICAL FIELD

Various examples relate generally to microscopy components, instruments, systems, and methods. Some examples represent combined use of electron microscopy and various types of spectroscopy.

SUMMARY

Example microscopy techniques include optical microscopy, charged particle microscopy, and scanning probe microscopy. For example, scanning transmission electron microscopy (STEM), which is a type of charged particle microscopy, works by sending a focused electron beam through a relatively thin sample and capturing the electrons that have passed through the sample to create a detailed two-dimensional (2D) image. Example types of scanning probe microscopy include atomic force microscopy (AFM), scanning tunnelling microscopy (STM), and near-field scanning optical microscopy (NSOM). Spectroscopy is used to measure and interpret electromagnetic or corpuscular spectra, which typically represent the flux of the corresponding physical quantity as a function of time, mass, angle, wavelength, frequency, or energy.

Disclosed herein are, among other things, various examples, aspects, features, and embodiments of scientific instrument support systems, as well as related methods, apparatus, computing devices, and computer-readable media. Some embodiments provide a scientific instrument including detectors supporting one or more spectroscopic modalities and an imaging modality and further including an electronic controller configured to process streams of measurements received from the detectors. The electronic controller operates to generate a base image of the sample based on the measurements corresponding to the imaging modality and further operates to generate an anomaly map of the sample based on the base image and further based on differences between measured and autoencoder-reconstructed spectra corresponding to different pixels of the base image. In at least some instances, the anomaly map can beneficially be used in a quality-control procedure to identify, within seconds, specific problem spots in the sample for more-detailed inspection and/or analyses.

One example provides an apparatus comprising: an electron-beam column configured to scan an electron beam across a sample; a plurality of detectors configured to measure signals caused by interaction of the electron beam with the sample, the plurality of detectors including a first detector for a first modality and a second detector for an imaging modality; and an electronic controller connected to receive streams of measurements from the plurality of detectors and configured to: for each pixel of a base image of the sample generated using the imaging modality, map, with an autoencoder, a respective first input vector to a respective probability density in a latent space, with the respective first input vector and the base image being obtained based on the streams of measurements, the respective first input vector corresponding to the first modality; compute, with the autoencoder, a respective first output vector corresponding to the respective probability density; and generate an anomaly map of the sample based on respective differences corresponding to different pixels of the base image, each of the respective differences being a difference between the respective first input vector and the respective first output vector.

Another example provides a support apparatus for a scientific instrument, the support apparatus comprising: an interface device configured to receive streams of measurements from a plurality of detectors of the scientific instrument, the plurality of detectors being configured to measure signals caused by interaction of an electron beam with a sample and including a first detector for a first modality of the scientific instrument and a second detector for an imaging modality of the scientific instrument; and a processing device configured to: for each pixel of a base image of the sample generated using the imaging modality, map, with an autoencoder, a respective first input vector to a respective probability density in a latent space, with the respective first input vector and the base image being obtained based on the streams of measurements, the respective first input vector corresponding to the first modality; compute, with the autoencoder, a respective first output vector corresponding to the respective probability density; and generate an anomaly map of the sample based on respective differences corresponding to different pixels of the base image, each of the respective differences being a difference between the respective first input vector and the respective first output vector.

Yet another example provides an automated method performed via a computing device for providing support to a scientific instrument, the method comprising: receiving streams of measurements from a plurality of detectors of the scientific instrument, the plurality of detectors being configured to measure signals caused by interaction of an electron beam with a sample and including a first detector for a first modality of the scientific instrument and a second detector for an imaging modality of the scientific instrument; for each pixel of a base image of the sample generated using the imaging modality, mapping, with an autoencoder, a respective first input vector to a respective probability density in a latent space, with the respective first input vector and the base image being obtained based on the streams of measurements, the respective first input vector corresponding to the first modality; computing, with the autoencoder, a respective first output vector corresponding to the respective probability density; and generating an anomaly map of the sample based on respective differences corresponding to different pixels of the base image, each of the respective differences being a difference between the respective first input vector and the respective first output vector.

Yet another example provides a non-transitory computer-readable medium storing instructions that, when executed by a computing device, cause the computing device to perform operations comprising the above automated method.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing aspects and many of the attendant advantages of the present disclosure will become more readily appreciated as the same become better understood by reference to the following detailed description, when taken in conjunction with the accompanying drawings.

FIGS. 9A-9B illustrate a first example of autoencoder-based processing of experimental data generated with the scientific instrument of FIG. 1, in accordance with an embodiment.

FIGS. 10A-10B illustrate a second example of autoencoder-based processing of experimental data generated with the scientific instrument of FIG. 1, in accordance with an embodiment.

DETAILED DESCRIPTION

Reference herein to "one embodiment" or "an embodiment" means that a particular feature, structure, or characteristic described in connection with the embodiment can be included in at least one embodiment of the disclosure. The appearances of the phrase "in accordance with one embodiment" or "in accordance with an embodiment" in various places in the specification are not necessarily all referring to the same embodiment, nor are separate or alternative embodiments necessarily mutually exclusive of other embodiments. The same applies to the term "implementation."

Figure 1:
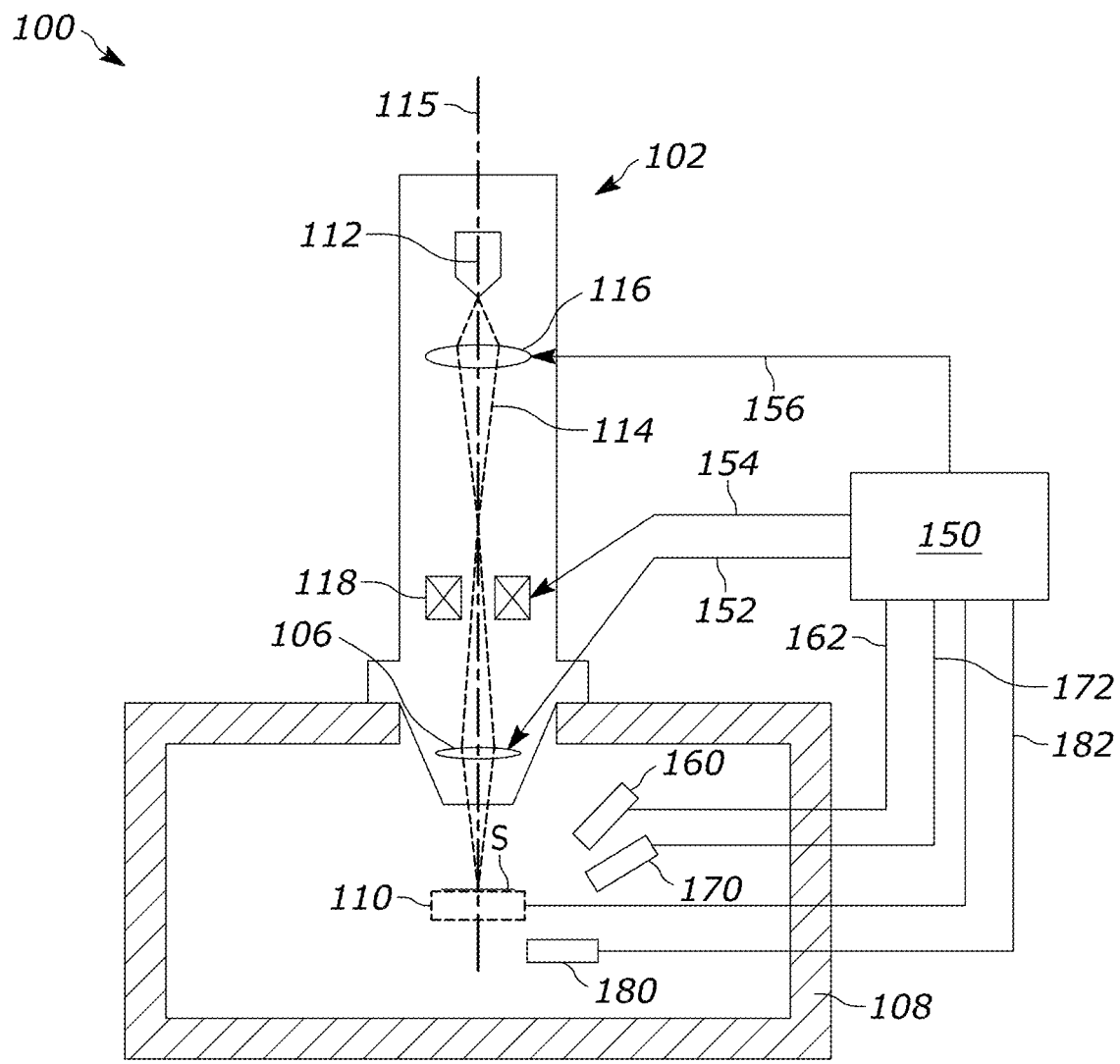
FIG. 1 is a block diagram illustrating an example scientific instrument in accordance with some embodiments.

FIG. 1 is a block diagram illustrating a scientific instrument 100 in accordance with some embodiments. The scientific instrument 100 includes a scanning transmission electron microscope (STEM) column 102 coupled to a vacuum chamber 108. The vacuum chamber 108 houses therein a movable sample holder 110 and can be evacuated using one or more vacuum pumps (not explicitly shown in FIG. 1). In an example embodiment, the sample holder 110 is independently movable parallel to the XY-coordinate plane and parallel to the Z-coordinate axis, with the corresponding coordinate system being indicated by the XYZ-coordinate triad shown in FIG. 1. A sample S to be interrogated using the scientific instrument 100 is mounted in the sample holder 110 as indicated in FIG. 1.

In the example shown, the STEM column 102 comprises an electron source 112 and two or more charged-particle-beam (CPB) lenses, only two of which, i.e., an objective lens 106 and a condenser lens 116, are schematically shown in FIG. 1 for illustration purposes. In some examples, a different (from two) number of such lenses may be used in the STEM column 102. In some embodiments, the objective lens 106 can be an ultra-high-resolution (UHR) lens.

In operation, the electron source 112 generates an electron beam 114 propagating generally along a longitudinal axis 115 of the STEM column 102. CPB lenses 106 and 116 are operated to generate electric and magnetic fields that affect electron trajectories in the electron beam 114. Control signals 152, 156 generated by an electronic controller 150 are used to change the strengths and/or spatial configurations of the fields and impart desired properties on the electron beam 114. In general, the CPB lenses 106 and 116, control signals 152 and 156, and other pertinent components of the scientific instrument 100 can be used to perform various operations and support various functions, such as beam focusing, aberration mitigation, aperture cropping, filtering, etc. The STEM column 102 further comprises a deflection unit 118 that can steer the electron beam 114 in response to a control signal 154 applied thereto by the electronic controller 150. Such beam steering can be used to move a focused portion of the electron beam 114 along a desired path across the sample S, e.g., to perform a raster or vector scan thereof.

The scientific instrument 100 also includes detectors 160, 170, 180 located in the vacuum chamber 108 in relatively close proximity to the sample S. In operation, the detectors 160, 170, and 180 generate streams of measurements 162, 172, and 182, which are received by the electronic controller 150. Specific types of the detectors 160, 170, 180 depend on the embodiment of the scientific instrument 100 and can typically be chosen from a variety of detector types suitable for detecting different types of emission and/or radiation from the sample S produced thereby in response to the electron beam 114. Example types of the emission/radiation that can be produced in this manner include, but are not limited to, X-rays, infrared light, visible light, ultraviolet light, back-scattered electrons, secondary electrons, Auger electrons, elastically scattered electrons, non-scattered (e.g., zero energy loss) electrons, and non-elastically scattered electrons. In various embodiments, a different (from three) number of such detectors can be used (also see FIG. 2). In some embodiments, the detectors 160, 170, 180 are selected from the group consisting of a high-angle annular dark field detector, a medium-angle annular dark field detector, an annular bright field detector, a segmented annular detector, a differential phase contrast detector, an EELS detector, an EDS detector, and a two-dimensional pixelated diffraction-pattern detector. In some examples, an EELS detector is configured to detect non-scattered electrons. In such examples, the corresponding detected signal can be used to experimentally determine the thickness of the sample S. Other detectors capable of detecting various ones of the above-mentioned types of emission/radiation can also be used in various additional embodiments.

In the example shown, the detectors 160, 170 are positioned above the sample S. The detector 180 is positioned below the sample S. Herein, the terms "above" and "below" are used relative to the propagation direction of the electron beam 114, which propagates generally along the Z-coordinate axis, from the electron source 112 toward the sample S. In this sense, locations that are "above" the sample S have a non-zero offset from the sample S along the Z-coordinate axis in the upstream direction of the electron beam 114. Similarly, locations that are "below" the sample S have a non-zero offset from the sample S along the Z-coordinate axis in the downstream direction of the electron beam 114. In various additional embodiments, different numbers of detectors can be located above and below the sample S. In some embodiments, all such detectors can be located below or above the sample S.

Figure 2:
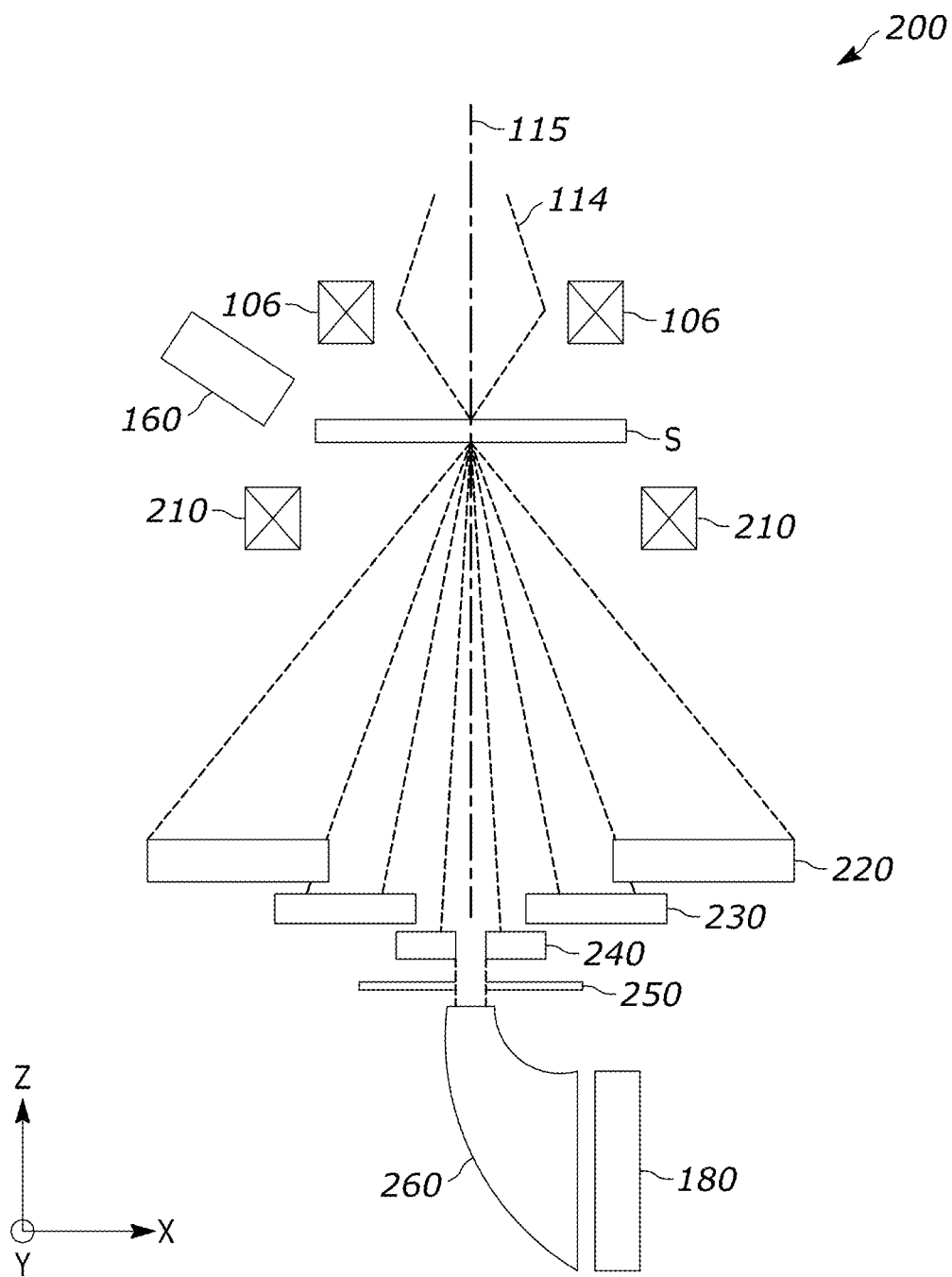
FIG. 2 is a block diagram illustrating a portion of the scientific instrument of FIG. 1 in accordance with one embodiment.

FIG. 2 is a block diagram illustrating a portion 200 of the scientific instrument 100 in accordance with one example embodiment. The portion 200 is an illustrative example of a detector configuration suitable for combined use of spectroscopy and microscopy in the scientific instrument 100. Both spectroscopy and microscopy are useful tools for sample analyses individually, but when combined, spectroscopy and microscopy can yield even more powerful results. In the example shown, the portion 200 provides a STEM imaging capability. The spectroscopy techniques implemented in the portion 200 include, but are not limited to, Electron Energy Loss Spectroscopy (EELS) and Energy-Dispersive X-ray Spectroscopy (EDS). In various additional examples, other microscopy/spectroscopy combinations are implemented.

The portion 200 includes the objective lens 106, the sample S, and the detectors 160, 180 also shown in FIG. 1. The portion 200 further includes a projector lens 210, annular detectors 220, 230, and 240, an aperture 250, and a magnetic field sector 260. FIG. 2 also schematically shows the electron beam 114 delivered to the sample S as described above in reference to FIG. 1. The STEM imaging modality of the scientific instrument involves sequential scans of a focused portion of the electron beam 114 over a selected part of the sample S with the use of some or all of the annular detectors 220, 230, and 240, which select electrons with different scattering angles with respect to the propagation direction of the electron beam 114. Pixel-by-pixel data acquisition carried out in this manner is used, inter alia, to construct STEM images of the scanned area of the sample S.

In some examples, the annular detector 220 is a high-angle annular dark field (HAADF) detector configured for detection of incoherent quasi-elastic electron scattering by nuclei, which is usually a dominant component for scattering angles higher than 80 mrad. Application of suitable models to the evaluation of incoherent electron scattering detected with the HAADF detector 220 enables, for example, determination of chemical species in single-layered materials and thin films, detection of heavy atom impurities in nanowires, and assessment of the three-dimensional (3D) morphology of nanocrystals. Another important application of the HAADF modality pertains to heterogeneous catalysis research, as the size of metal particles and their distribution in a catalyst have significant effects on the catalyst's potency.

In some examples, the annular detector 230 is a medium-angle annular dark field (MAADF) detector configured to detect electrons with scattering angles between approximately 30 and 80 mrad. A combination of HAADF and MAADF modalities is applied, e.g., to the extraction of additional features from crystalline samples. One example of such applications is a designed use of specific angular ranges for selecting high-order Laue zones (HOLZ), which can provide information about the ordering of atomic species along the electron beam direction. The MAADF modality can also be applied to 3D defect analyses in STEM tomography.

In some examples, the annular detector 240 is an annular bright field (ABF) detector configured to detect electrons at low scattering angles. Information extracted from the analyses of signals generated by the ABF detector 240 typically pertains to lighter atomic species. For example, a combination of HAADF and ABF modalities can be used for direct imaging of atomic columns of oxygen in metal oxides, such as $Al_2O_3$, and atomic columns of hydrogen in metal hydrides, such as $VH_2$. In another example, a combination of HAADF and ABF modalities can be used for unambiguous identification of chemical species on single-layered nitrides, such as BN, which is often used in electronics as a substrate for semiconductors.

Various electron-microscopy-based spectroscopic techniques are typically directed at obtaining quantitative and/or qualitative information from various signals generated during the scanning of the electron beam 140 over the sample S. After proper collection, the spectroscopic signals can be used for the construction of maps of material properties to be presented together with or overlaid onto the corresponding electron-microscopy images, e.g., generated as indicated above with one or more of the annular detectors 220, 230, and 240 and/or other suitable detectors. One example of such maps, in the form of a data hypercube representation, is described in more detail below in reference to FIG. 3. As used herein, the term "hypercube" refers to a generalization of a three-dimensional cube to n dimensions, where n is a positive integer greater than one. In various examples, the hypercube may or may not be normalized to have edges of unit length. In some literature, a hypercube is referred to as an n-cube or a measure polytope. A hypercube is a regular polytope with mutually perpendicular sides and, as such, is an orthotope. A two-dimensional hypercube is a square. A three-dimensional hypercube is a cube. A four-dimensional hypercube is a tesseract, and so on. An example data structure 300 illustrated in FIG. 3 represents a non-normalized tesseract, wherein each element (i, j) of a STEM image 302 is associated with a respective EDS spectrum $304_{i,j}$ measured using the EDS detector 160 and a respective EELS spectrum $306_{i,j}$ measured using the EELS detector 180.

In some examples illustrated in FIG. 2, the detector 160 operates as an EDS detector, which is configured to detect emission of characteristic X-rays from the sample S stimulated by the electron beam 114. In the ground (unexcited) state, an atom within the sample S has its electrons in discrete energy levels of the atom's inner electron shells. Interaction of the electron beam 114 with the atom may cause an electron to be ejected from an inner shell of the atom, thereby creating an electron hole (vacancy) therein. A recombination of this electron hole with an electron from an outer (higher energy) shell of the atom then causes an emission of an X-ray photon. The flux of such X-ray photons and their energies are measured by the EDS detector 160, which thereby measures the corresponding X-ray emission spectrum. Since each chemical element has a unique set of peaks in the X-ray emission spectrum, analyses of the X-ray spectra measured by the EDS detector 160 can be used to reveal the elemental composition of the sample S.

In some examples illustrated in FIG. 2, the detector 180 operates as an EELS detector, which is configured to detect inelastically scattered electrons of the electron beam 140 propagating within a narrow range of angles selected by the aperture 250. The electrons that pass through the aperture 250 further pass through the magnetic field sector 260 wherein the electrons are angularly dispersed by the magnetic field before impinging onto the EELS detector 180. Different pixels of the EELS detector 180 thus receive electrons of different respective energies, with the pixel readout providing a corresponding energy-loss spectrum. The amount of energy loss measured in this manner can be interpreted in terms of what caused the energy loss. For example, inelastic interactions that can cause energy losses detectable by the EELS detector 180 include phonon excitations, inter- and intra-band transitions, plasmon excitations, inner shell ionizations, and Cherenkov radiation. The inner-shell ionizations, as detected by the EELS detector 180, may be particularly useful for detecting the elemental composition of the sample S.

Figure 3:
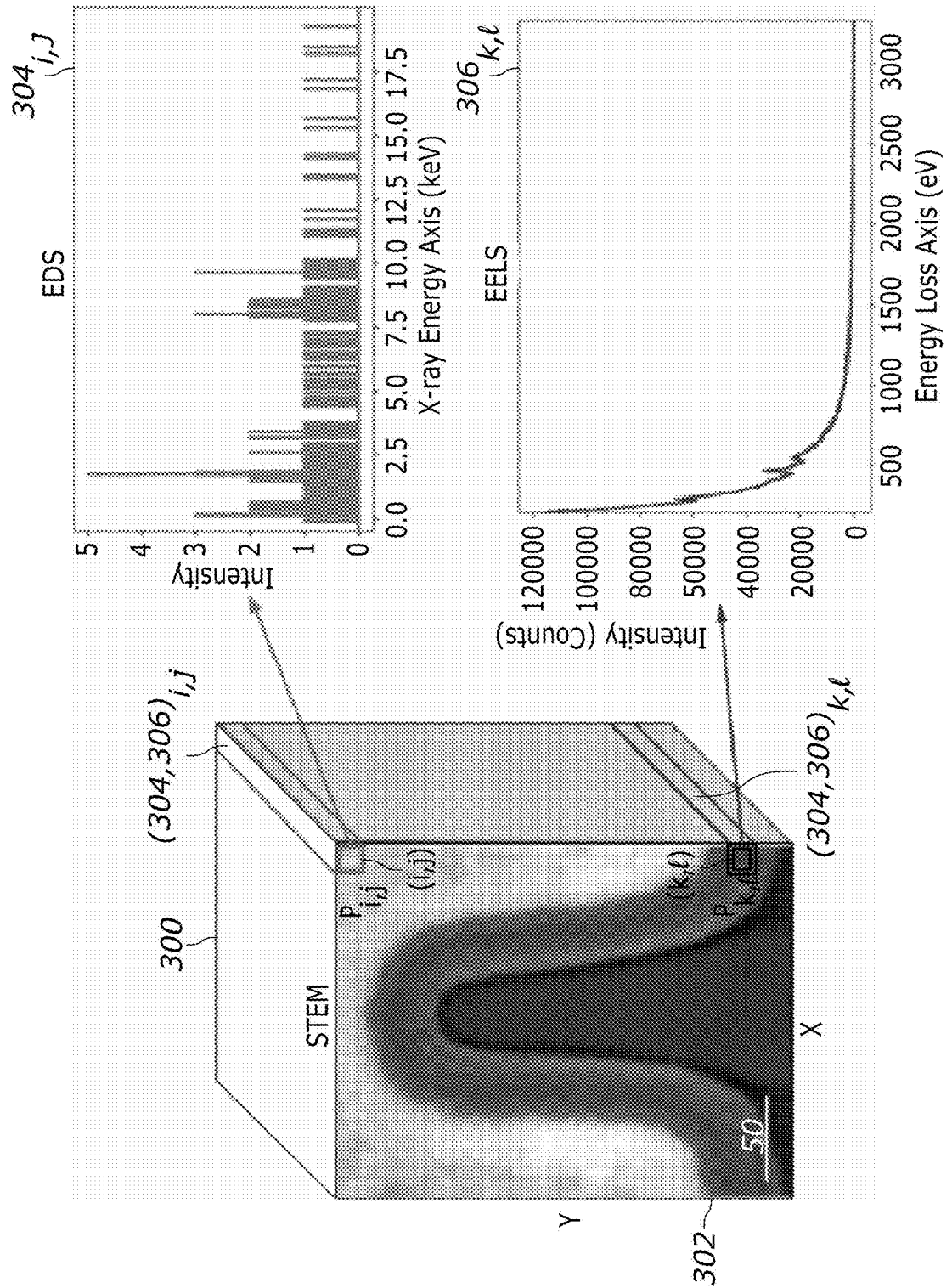
FIG. 3 graphically illustrates a data structure used in the scientific instrument of FIG. 1 according to one example.

FIG. 3 graphically illustrates a data structure 300 used in the scientific instrument 100 according to one example. The data structure 300 includes a STEM image 302 of the sample S generated using the STEM modality of the scientific instrument 100, e.g., based on the measurements performed with one or more of the annular detectors 220, 230, and 240 or other suitable detectors. The STEM image 302 is a pixelated image, wherein each pixel is characterized by the respective coordinates $(x_i, y_j)$ and the pixel value $P_{i,j}$, where (i, j) are the pixel indices. Depending on the type of the image 302, the pixel value $P_{i,j}$ can be a scalar (e.g., an intensity value) or a vector (e.g., an RGB color vector). For one channel measurements, the pixel values $P_{i,j}$ are typically mapped to a gray scale. The coordinates $(x_i, y_i)$ generally represent the pixel's position in the XY coordinate plane of the XYZ coordinate system shown in FIGS. 1-2. For each pixel $(x_i, y_i)$, in addition to the pixel value $P_{i,j}$, the data structure 300 contains a respective EDS spectrum $304_{i,j}$ measured using the EDS detector 160 and a respective EELS spectrum $306_{i,j}$ measured using the EELS detector 180.

As an example, the (i, j)-th and (k, l)-th pixels of the STEM image 302 are marked on the image facet of the tesseract representation of the data structure 300. For the (i, j)-th pixel of the STEM image 302, the data structure 300 contains the pixel value $P_{i,j}$, an EDS spectrum $304_{i,j}$, and an EELS spectrum $306_{i,j}$. For illustration purposes, only the EDS spectrum $304_{i,j}$ is explicitly shown in FIG. 3. Similarly, for the (k, l)-th pixel of the STEM image 302, the data structure 300 contains the pixel value $P_{k,l}$, an EDS spectrum $304_{k,l}$, and an EELS spectrum $306_{k,l}$. For illustration purposes, only the EELS spectrum $306_{k,l}$ is explicitly shown in FIG. 3.

Depending on the specific set of detectors used in and/or spectroscopic modalities of the corresponding embodiment of the scientific instrument 100, other data structures (generally analogous to the data structure 300) can similarly be generated. In some examples, such other data structures may have more or fewer dimensions than the data structure 300. In various embodiments, different sets of detectors for the scientific instrument 100 can be selected from the group of detectors including, but not limited to, an annular dark field detector (e.g., 220, 230), an annular bright field detector (e.g., 240), an EDS detector (e.g., 160), an EELS detector (e.g., 260, 180), a differential phase contrast (DPC) detector, and a 2D diffraction-pattern detector. In some examples, the 2D diffraction-pattern detector comprises a fluorescent screen used to capture and record various electron diffraction patterns. In some examples, the 2D diffraction-pattern detector is pixelated.

In one example, a DPC STEM detector includes a segmented annular detector, e.g., having two diametrically opposed quadrant segments. A representative angular range of the detector segments is from approximately 15 mrad to approximately 30 mrad. The DPC STEM signal is generated by taking a difference of the individual signals generated by the two diametrically opposed quadrant segments. For a weakly scattering sample S that can be regarded as a phase object, DPC STEM images represent the gradient of the sample's electromagnetic field taken in the direction of the opposed detector segments. Implementations of DPC STEM imaging with sub-angstrom resolution beneficially enable direct characterization of local electromagnetic fields substantially at the level of single atoms. For example, both the mesoscopic polarization fields within each domain and the atomic-scale electric fields induced by the individual electric dipoles within each unit cell of various technological ferroelectric oxides, such as $BaTiO_3$, can be sensitively detected via DPC STEM imaging.

In another example, a 2D pixelated diffraction-pattern detector is used to implement four-dimensional (4D) STEM. The 4D STEM is a technique that captures a full 2D diffraction pattern for each pixel of the STEM image 302. This capability is a relatively recent advance made possible by the development of high-speed direct electron detector technology. For comparison, prior to this development, the full 2D diffraction pattern was typically sampled only in one or two parts thereof, thereby leaving uncaptured a large portion of the diffracted-signal information. A typical 4D STEM output includes a 4D data set, wherein the diffracted signal is presented as a function of the coordinates $(x_i, y_i, X_j, Y_j)$, where the coordinates $(x_i, y_i)$ are the i-th pixel coordinates in the STEM image 302, and the coordinates $(X_j, Y_j)$ are the j-th pixel coordinates in the 2D pixelated diffraction-pattern detector. One important application of the 4D STEM relates to virtual imaging. Another important application of the 4D STEM relates to DPC STEM imaging.

Figure 4:
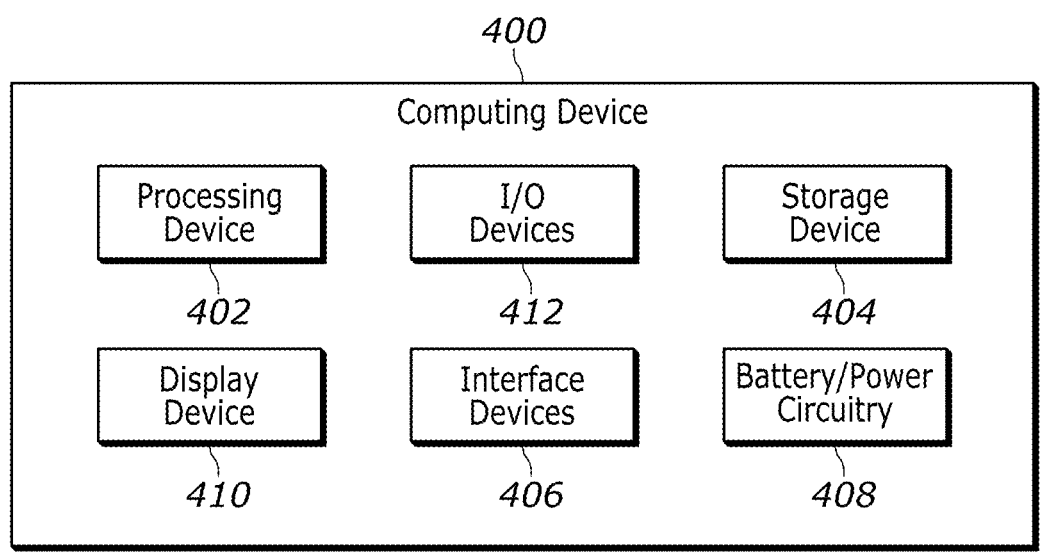
FIG. 4 is a block diagram of an example computing device configured to perform at least some scientific-instrument support operations in accordance with various embodiments.

FIG. 4 is a block diagram of an example computing device 400 configured to perform at least some scientific-instrument support operations in accordance with various embodiments. For example, in some embodiments, the computing device 400 performs at least some operations of the electronic controller 150 (also see FIG. 1). In various embodiments, a support module of the scientific instrument 100 may be implemented by a single computing device 400 or by multiple computing devices 400.

The computing device 400 of FIG. 4 is illustrated as having a number of components, but any one or more of these components may be omitted or duplicated, as suitable for the application and setting. In some embodiments, some or all of the components included in the computing device 400 may be attached to one or more motherboards and enclosed in a housing. In some embodiments, some of those components may be fabricated onto a single system-on-a-chip (SoC) (e.g., the SoC may include one or more processing devices 402 and one or more storage devices 404). Additionally, in various embodiments, the computing device 400 may not include one or more of the components illustrated in FIG. 4, but may include interface circuitry for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 400 may not include a display device 410, but may include display device interface circuitry (e.g., a connector and driver circuitry) to which an external display device 410 may be coupled.

The computing device 400 includes a processing device 402 (e.g., one or more processing devices). As used herein, the term "processing device" refers to any device or portion of a device that processes electronic data from registers and/or memory to transform that electronic data into other electronic data that may be stored in registers and/or memory. In various embodiments, the processing device 402 may include one or more digital signal processors (DSPs), application-specific integrated circuits (ASICs), central processing units (CPUs), graphics processing units (GPUs), server processors, or any other suitable processing devices.

The computing device 400 also includes a storage device 404 (e.g., one or more storage devices). In various embodiments, the storage device 404 may include one or more memory devices, such as random-access memory (RAM) devices (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 404 may include memory that shares a die with the processing device 402. In such an embodiment, the memory may be used as cache memory and include embedded dynamic random-access memory (eDRAM) or spin transfer torque magnetic random-access memory (STT-MRAM), for example. In some embodiments, the storage device 404 may include non-transitory computer readable media having instructions thereon that, when executed by one or more processing devices (e.g., the processing device 402), cause the computing device 400 to perform any appropriate ones of the methods disclosed herein below or portions of such methods.

The computing device 400 further includes an interface device 406 (e.g., one or more interface devices 406). In various embodiments, the interface device 406 may include one or more communication chips, connectors, and/or other hardware and software to govern communications between the computing device 400 and other computing devices. For example, the interface device 406 may include circuitry for managing wireless communications for the transfer of data to and from the computing device 400. The term "wireless" and its derivatives may be used to describe circuits, devices, systems, methods, techniques, communications channels, etc., that may communicate data via modulated electromagnetic radiation through a nonsolid medium. The term does not imply that the associated devices do not contain any wires, although in some embodiments they might not. Circuitry included in the interface device 406 for managing wireless communications may implement any of a number of wireless standards or protocols, including but not limited to Institute for Electrical and Electronic Engineers (IEEE) standards including Wi-Fi (IEEE 802.11 family), IEEE 802.16 standards, Long-Term Evolution (LTE) project along with any amendments, updates, and/or revisions (e.g., advanced LTE project, ultramobile broadband (UMB) project (also referred to as "3GPP2"), etc.). In some embodiments, circuitry included in the interface device 406 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 406 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 406 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 406 may include one or more antennas (e.g., one or more antenna arrays) configured to receive and/or transmit wireless signals.

In some embodiments, the interface device 406 may include circuitry for managing wired communications, such as electrical, optical, or any other suitable communication protocols. For example, the interface device 406 may include circuitry to support communications in accordance with Ethernet technologies. In some embodiments, the interface device 406 may support both wireless and wired communication, and/or may support multiple wired communication protocols and/or multiple wireless communication protocols. For example, a first set of circuitry of the interface device 406 may be dedicated to shorter-range wireless communications such as Wi-Fi or Bluetooth, and a second set of circuitry of the interface device 406 may be dedicated to longer-range wireless communications such as global positioning system (GPS), EDGE, GPRS, CDMA, WiMAX, LTE, EV-DO, or others. In some other embodiments, a first set of circuitry of the interface device 406 may be dedicated to wireless communications, and a second set of circuitry of the interface device 406 may be dedicated to wired communications.

The computing device 400 also includes battery/power circuitry 408. In various embodiments, the battery/power circuitry 408 may include one or more energy storage devices (e.g., batteries or capacitors) and/or circuitry for coupling components of the computing device 400 to an energy source separate from the computing device 400 (e.g., to AC line power).

The computing device 400 also includes a display device 410 (e.g., one or multiple individual display devices). In various embodiments, the display device 410 may include any visual indicators, such as a heads-up display, a computer monitor, a projector, a touchscreen display, a liquid crystal display (LCD), a light-emitting diode display, or a flat panel display.

The computing device 400 also includes additional input/output (I/O) devices 412. In various embodiments, the I/O devices 412 may include one or more data/signal transfer interfaces, audio I/O devices (e.g., microphones or microphone arrays, speakers, headsets, earbuds, alarms, etc.), audio codecs, video codecs, printers, sensors (e.g., thermocouples or other temperature sensors, humidity sensors, pressure sensors, vibration sensors, etc.), image capture devices (e.g., one or more cameras), human interface devices (e.g., keyboards, cursor control devices, such as a mouse, a stylus, a trackball, or a touchpad), etc.

Depending on the specific embodiment of the scientific instrument 100 and/or of the instrument portion 200, various components of the interface devices 406 and/or I/O devices 412 can be configured to output suitable control signals (e.g., 152, 154, 156) for various components of the scientific instrument 100, receive suitable control/telemetry signals from various components of the scientific instrument 100, and receive streams of measurements (e.g., 162, 172, 182) from various detectors of the scientific instrument 100. In some examples, the interface devices 406 and/or I/O devices 412 include one or more analog-to-digital converters (ADCs) for transforming received analog signals into a digital form suitable for operations performed by the processing device 402 and/or the storage device 404. In some additional examples, the interface devices 406 and/or I/O devices 412 include one or more digital-to-analog converters (DACs) for transforming digital signals provided by the processing device 402 and/or the storage device 404 into an analog form suitable for being communicated to the corresponding components of the scientific instrument 100.

In some industrial applications of the scientific instrument 100, various spectroscopic modalities integrated therein are utilized for quality control, e.g., to determine whether the synthesized materials and/or manufactured (micro/nano) structures meet applicable specifications. For some of such spectroscopic techniques (e.g., EDS, EELS), fast measurements (e.g., including spectroscopic data acquisitions) produce signals with relatively low signal-to-noise-ratio (SNR) values. Owing to the low SNR values, certain types of signal processing, e.g., including repeated acquisition runs, binning, averaging, principal component analysis (PCA), etc., are typically applied to arrive at definitive quality-control determinations. An example limitation of some of these signal-processing methodologies is that they can be time intensive, especially when applied to relatively large fields of view and/or datasets corresponding to relatively high spatial resolutions. As another example, it should be noted that PCA is a linear technique not typically intended to handle nonlinear effects, such as the nonlinear effects observed for low-loss EELS or due to channeling. Such limitations typically translate into a disadvantageously long time (e.g., several hours) until the instrument's user/operator can gain sufficiently clear substantive, qualitative, and/or quantitative indicators with respect to the quality-control criteria being applied to the sample S.

The above-indicated and possibly some other related problems in the state of the art are beneficially addressed using at least some embodiments disclosed herein. One example embodiment uses deep learning techniques to speed up quality-control procedures. More specifically, a variational autoencoder implemented using a neural network is trained to learn the underlying statistics of a dataset and visualize the learned statistics in a lower-dimensional latent space by defining different clusters therein representing different respective chemical or structural features of the sample S. For example, when two spectra are similar, the trained variational autoencoder "codes" such spectra to nearby "points" within the latent space, typically located within the same cluster. Based on such "coding" of various acquired spectra to specific clusters within the latent space, the corresponding scientific-instrument support system can identify and highlight chemically similar areas within the sample S even when the detected signals have relatively low SNR values. As a result, the corresponding scientific-instrument support system is beneficially able to provide to the user/operator of the scientific instrument 100 pertinent chemical and/or structural information about the sample S substantially in real time (e.g., within seconds as opposed to hours), without relying on the time-intensive signal-processing methodologies mentioned above. Another embodiment relies on the trained variational autoencoder to identify, substantially in real time, anomalous regions in the sample S for which the acquired low-SNR spectra indicate significant and meaningful deviations from the expected sample characteristics. In quality-control procedures, such anomalous regions are of particular interest as potential problem spots. Based on the identification of such anomalous regions, the user/operator of the scientific instrument 100 can beneficially change (e.g., optimize) the instrument's experimental settings to investigate specific problem spots in greater detail, e.g., by applying higher magnification and/or suitable adaptive scanning patterns.

Figure 5:
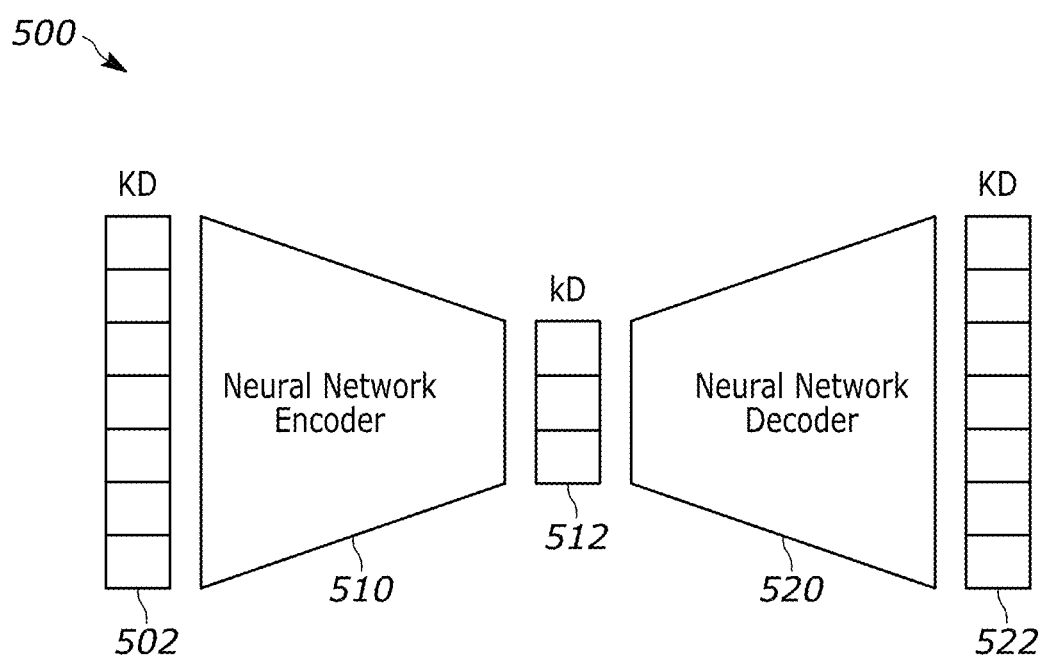
FIG. 5 is a block diagram illustrating an autoencoder used in the scientific instrument of FIG. 1 in accordance with some embodiments.

FIG. 5 is a block diagram illustrating an autoencoder 500 used in the scientific instrument 100 in accordance with some embodiments. In some examples, the autoencoder 500 is implemented using the computing device 400 appropriately coupled to pertinent components of the scientific instrument 100, e.g., as explained above. The autoencoder 500 includes an encoder 510 and a decoder 520. Each of the encoder 510 and the decoder 520 comprises a respective neural network.

Herein, a neural network (NN) is a typically nonlinear trainable circuit comprising a plurality of processing elements (PEs), also referred to as "neurons," "artificial neurons," or "NN nodes." In some implementations, a neural network is an application-specific circuit, wherein different PEs are implemented as respective configurable sub-circuits connected by physical links forming the corresponding physical network. In some other implementations, a neural network may be computer- or processor-emulated, in which case one or more electronic processors (e.g., 402, FIG. 4) are programmed to perform signal processing analogous to that of the corresponding application-specific circuit.

Each PE of a neural network typically has connections with one or more other PEs. The plurality of connections between the (physical or computer-emulated) PEs defines the neural network's topology. In some topologies, the PEs are aggregated into layers. Different layers may have different types of PEs configured to perform different respective kinds of transformations on their inputs. Signals travel from the first PE layer (typically referred to as the input layer) to the last PE layer (typically referred to as the output layer). In some topologies, the neural network has one or more intermediate PE layers (typically referred to as the hidden layers) located between the input and output PE layers. An example PE operates to scale, sum, and bias the incoming signals and use an activation function to produce an output signal that is a static nonlinear function of the biased sum. The resulting PE output may become either one of the neural network's outputs or be sent to one or more other PEs through the corresponding connection(s). The respective weights and/or biases applied by individual PEs can be changed (e.g., optimized) during the training (learning) mode of operation and are typically fixed (i.e., constant) during the testing (working) mode of operation.

An input to the NN encoder 510 is a K-dimensional (KD) vector 502. The configuration of the NN encoder 510 includes a set of weights and biases, denoted as θ. In some examples, an output of the NN encoder 510 is a k-dimensional (kD) vector 512, where k<K. The kD vector 512 is also referred to as the hidden representation. The kD space corresponding to the vectors 512 is referred to as the latent space. Hereafter, the transformation performed by the NN encoder 510 is denoted as $q_\theta(z|x)$, where z and x denote the corresponding kD and KD vectors, respectively. In case of a variational autoencoder 500, the latent space is stochastic, i.e., the NN encoder 510 outputs parameters to $q_\theta(z|x)$ as a probability density. In some examples, the probability density is a Gaussian probability density. In such examples, the NN encoder 510 maps the input vector 502 to a mean and a variance in the latent space. The NN decoder 520 then operates to sample the latent distribution to perform a decoding operation. An input to the NN decoder 520 is the kD vector 512. The configuration of the NN decoder 510 includes a set of weights and biases, denoted as ϕ. An output of the NN decoder 520 is a KD vector 522. Hereafter, the transformation performed by the NN decoder 520 is denoted as $p_\phi(x|z)$. In various additional embodiments, other encoder/decoder architectures of the autoencoder 500 are similarly used. Some of such additional embodiments have the following features: (i) k>K, which is associated with a relatively large memory layer, and (ii) the use of PCA to go from such larger k dimensionality to a small dimensionality.

Since k is smaller than K, the NN encoder 510 performs a dimensionality reduction. In machine learning, "dimensionality reduction" is a process of reducing the number of features that describe data. The number of features is typically reduced either via selection (only some existing features are conserved) or by extraction (a reduced number of new features are created based on the old features). The dimensionality reduction can be useful in many applications that rely on low-dimensional data. The dimensionality reduction can also be interpreted as data compression, wherein the encoder 510 compresses the data from the initial space to the latent space, whereas the decoder 520 decompresses the data. Depending on the initial data distribution, the latent space dimensionality, and the encoder definition, the data compression can be lossy, meaning that a part of the information is lost during the encoding process and cannot be fully recovered through decoding. For example, due to the information loss, the output vector 522 typically differs from the input vector 502. A measure of the information loss is the reconstruction log-likelihood log $p_\phi(x|z)$. This measure is a measure of how effectively the NN decoder 520 has learned to reconstruct the input vectors 502 given their respective latent representations 512.

The sets of weights and biases θ and ϕ for the autoencoder 500 are determined during the training (learning) mode of operation based on a loss function. The loss function of a variational autoencoder 500 is constructed using the negative log-likelihood with a regularizer. In some examples, the total loss function, $L(\theta, \phi, x, z)$, is decomposed into a sum of loss functions $l_i(\theta, \phi)$ corresponding to individual input vectors $x_i$ as follows:

$$L(\theta, \phi, x, z) = \sum_{i=1}^{N} l_i(\theta, \phi) \quad (1)$$

where the function $l_i(\theta, \phi)$ is expressed as:

$$l_i(\theta, \phi) = -E_{q_\theta(z|x_i)}[\log p_\phi(x_i|z)] + \beta D_{KL}(q_\theta(z|x_i) \| p(z)) \quad (2)$$

where the first term represents reconstruction loss for the vector x, in the form of the expected negative log-likelihood F; and the second term is the regularizer in the form of the weighted Kullback-Leibler (KL) divergence (I) between the encoder's distribution $q_\theta(z|x)$ and the latent space distribution $p(z)$, with β being a positive weighting factor. In some examples, the weighting factor is β=1. The first term of the loss function expressed by Eq. (2) "encourages" the decoder 520 to learn how to reconstruct the data well. When the decoder's output vector 522 does not reconstruct the input vector 502 well, it means, in the statistical language, that the decoder 520 parameterizes a likelihood distribution that does not place much probability mass on the true data. Poor reconstruction will incur a large cost according to the loss function expressed by Equations (1)-(2). The KL divergence between the latent posterior distribution and the (Gaussian) prior keeps the latent space regularized by forcing its distributions to be close to Gaussian distributions. For example, when the encoder 510 outputs latent representations z that differ from a standard normal Gaussian distribution, the loss function expressed by Equations (1)-(2) imposes a corresponding penalty. In the absence of the regularizer, the encoder 510 may give each input vector a representation in a different region of the latent space. However, the regularizer has the effect of keeping representations of "similar" input vectors close together in the latent space.

In some examples, during the training mode of operation, the autoencoder 500 is trained on a training set $\{x_i\}$ to approximately minimize the loss function $L(\theta, \phi, x, z)$ with respect to the parameters θ of the encoder 510 and the parameters ϕ of the decoder 520 using suitable gradient descent methods. For example, for stochastic gradient descent with a step size p, the encoder parameters θ are recursively and iteratively updated based on the gradient of the loos function as follows:

$$\theta \leftarrow \theta - \rho \frac{\partial L}{\partial \theta} \quad (3)$$

The decoder parameters ϕ are updated in a similar manner. The iterations stop when the convergence criteria are met. The parameters θ and ϕ are fixed thereafter for being used in the testing (working) mode of operation of the autoencoder 500.

In some examples, the vectors 502, 512, and 522 represent a single modality of the scientific instrument 100. In such examples, the input vector 502 is a single spectrum generated with the corresponding spectroscopic modality of the scientific instrument 100. In one specific example, the input vector 502 is the EDS spectrum $304_n$. In another specific example, the input vector 502 is the EELS spectrum $306_m$. In further specific examples, the output of another single detector used in the corresponding spectroscopic modality of the scientific instrument 100 is similarly used to obtain the input vector 502. In some examples, the dimensionality of the latent space is k=2, which lends the latent space to relatively straightforward visualization for the user/operator to view and inspect. In other examples, other dimensionality values k are similarly used.

In various examples, a Gaussian Mixture model (GMM) is used to classify the latent space, e.g., by clustering the latent space representations of the training dataset. A GMM fits d Gaussian distributions (where the number d is a parameter) to the latent-space data such that the likelihood of the data being generated by these Gaussians is maximal (e.g., based on the Expectation Maximization algorithm). The use of GMMs is suitable for variational autoencoders, e.g., because the encoded data are expected to approximately follow a Gaussian distribution due to the nature of the prior of the variational autoencoder. In some examples, the number d is determined based on the elbow method heuristic using the BIC (Bayesian Information Criterion) and/or the AIC (Akaike Information Criterion). For each GMM, clustering is performed several (e.g., ten) times, and the best cluster classification among the several classifications is chosen based on the feature (e.g., chemical-element) variance as it pertains to the training dataset. In some examples, a Density-Based Spatial Clustering of Applications with Noise (DBSCAN) algorithm is used for density-based clustering.

In some other examples, the vectors 502, 512, and 522 represent two spectroscopic modalities of the scientific instrument 100. In such examples, the input vector 502 is a combination of two spectra generated using the corresponding selected pair of detectors of the scientific instrument 100. In one specific example, the input vector 502 is a combination (e.g., a concatenation) of the EDS and EELS spectra (304, 306)$_{i,j}$ (also see FIG. 3). In other specific examples, outputs of other detector pairs used in the corresponding embodiment of the scientific instrument 100 are similarly used to obtain the input vector 502. Some embodiments may benefit from certain features described in the article by Svetlana Kutuzova, Oswin Krause, Douglas McCloskey, et al., entitled "Multimodal Variational Autoencoders for Semi-Supervised Learning: In Defense of Product-of-Experts," Preprint submitted to Artificial Intelligence, Aug. 2, 2021, which is incorporated herein by reference in its entirety.

In some instances, representations of the two modalities of the scientific instrument 100 are combined in the autoencoder 500 by stacking the latent representations obtained from the corresponding separate single-modality models. Each of the single-modality models has learned a respective two-dimensional (k=2) latent representation of the data of the corresponding single modality, e.g., as indicated above. The stacking of these latent representations results in a four-dimensional (k=4) latent representation for each pixel that contains spectra from both of the two modalities. GMM clustering is then applied to this 4D latent space, with the BIC and AIC being used to find an appropriate number (d) of clusters. Similar to the unimodal configuration of the autoencoder 500, clustering is performed several (e.g., ten) times for each GMM, and the best cluster classification among the several classifications is chosen based on the feature (e.g., chemical-element) variance as it pertains to the training dataset.

In some instances, the autoencoder 500 representing two selected modalities of the scientific instrument 100 is trained using a training dataset that is structurally similar to the data structure 300 (FIG. 3). In other words, the training dataset used in this approach has a respective pair of spectra for each pixel of the corresponding image, both of which spectra are fed into the encoder 510 in the form of the input vector 502 during the training mode of operation of the autoencoder 500. Compared to the above-described stacking approach, the joint bimodal training enables correlations between the two modalities to be better reflected in the latent space and then exploited during the working mode of operation of the autoencoder 500.

Figure 6:
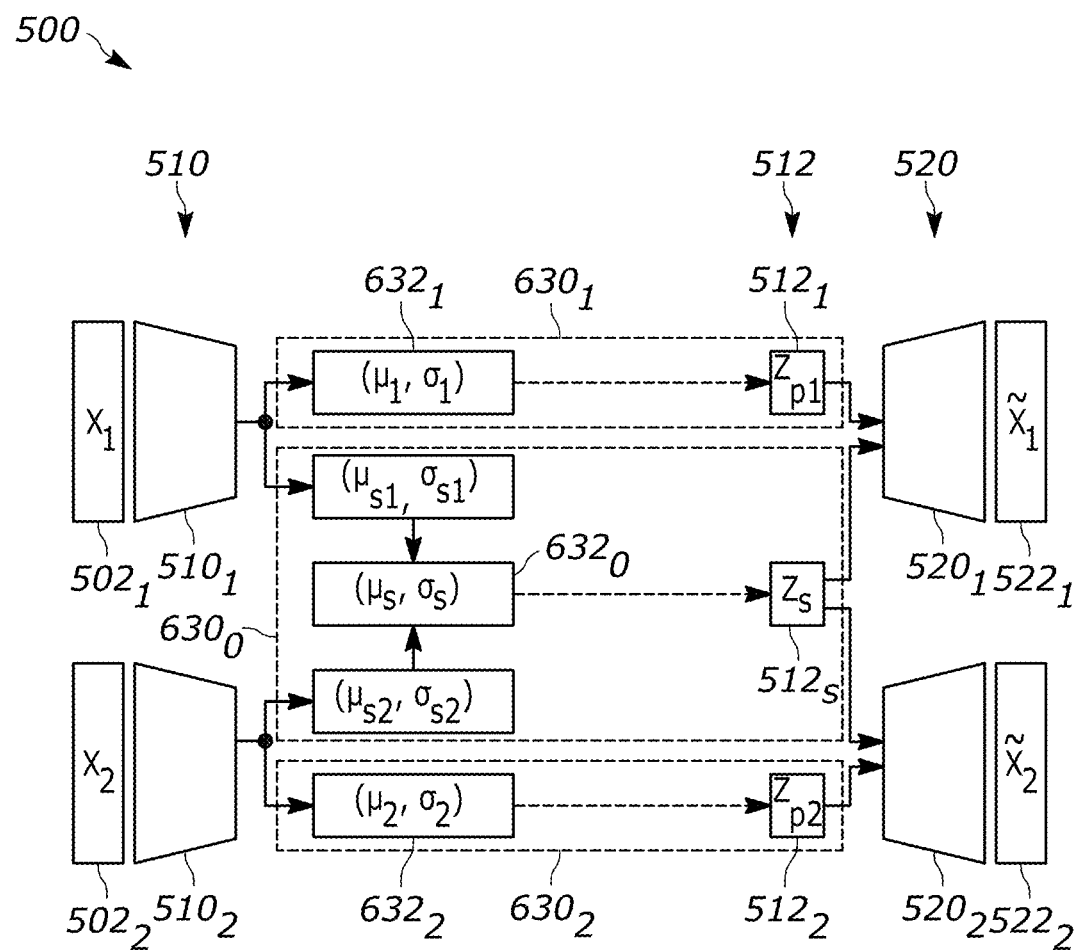
FIG. 6 is a block diagram illustrating an autoencoder used in the scientific instrument of FIG. 1 in accordance with some other embodiments.

FIG. 6 is a block diagram illustrating the autoencoder 500 used in the scientific instrument 100 in accordance with additional embodiments. In the example shown, the autoencoder 500 implements a disentangled bimodal variational autoencoder (DBVAE) configured to handle experimental data corresponding to two modalities (e.g., generated with two selected detectors) of the scientific instrument 100. In other examples (not explicitly shown), a similar autoencoder architecture is used to implement a disentangled multimodal variational autoencoder (DMVAE) 500 configured to handle experimental data corresponding to three or more modalities of the scientific instrument 100. From the description provided hereinbelow, a person of ordinary skill in the pertinent art will readily understand how to make and use such a DMVAE 500 without any undue experimentation.

The encoder 510 of the DBVAE 500 includes two encoder portions, labeled $510_1$ and $510_2$, respectively. Each of the encoder portions $510_1$ and $510_2$ is implemented using a respective neural network and, as such, is referred to as the "NN encoder portion." The input vector 502 includes two sub-vectors, labeled $502_1$ and $502_2$, respectively. The sub-vector $502_1$ corresponds to a first modality of the scientific instrument 100 and is applied to the NN encoder portion $510_1$. The sub-vector $502_2$ corresponds to a second modality of the scientific instrument 100 and is applied to the NN encoder portion $510_2$. In some examples, the sub-vectors $502_1$ and $502_2$ are the EDS and EELS spectra corresponding to the same pixel of the STEM image 302.

The latent space of the DBVAE 500 has: (1) two private subspaces $630_1$ and $630_2$, for the NN encoder portions $510_1$ and $510_2$, respectively, and (ii) a shared subspace $630_0$, which is shared by the NN encoder portions $510_1$ and $510_2$. Given the paired sub-vectors $502_1$ and $502_2$, $\{(x_1, x_2)\}$, the NN encoder portions $510_1$ and $510_2$ operate to infer latent representations $z_1 \sim q_{\theta_1}(z|x_1)$ and $z_2 \sim q_{\theta_2}(z|x_2)$, where $\theta_1$ and $\theta_2$ are the NN parameters of the NN encoder portions $510_1$ and $510_2$, respectively. The latent representations $z_1$ and $z_2$ are factorized into $z_1=[z_{p1}, z_{s1}]$ and $z_2=[z_{p2}, z_{s2}]$, where $z_{p1}$, $z_{p2}$ represent the latent representations of the modalities $x_1$ and $x_2$, respectively, in the respective private subspaces $630_1$ and $630_2$; and $z_{s1}$, $z_{s2}$ represent the latent representations of the modalities $x_1$ and $x_2$, respectively, in the shared subspace $630_0$. Since the latent space is stochastic, the various latent representations in the latent subspaces $630_0$, $630_1$, and $630_2$ are obtained by appropriately sampling the corresponding ones of the Gaussian probability densities $632_0$, $632_1$, and $632_2$, each of which is characterized by a respective pair of mean and variance values ($\mu$, $\sigma$), as indicated in FIG. 6. For the latent representations 251, 252 in the shared subspace $630_0$, the training of the DBVAE 500 is configured to effectively make $z_{s1}=z_{s2}=z_s$, which enables the use of the shared Gaussian probability density $632_0$ characterized by a single pair of mean and variance values ($\mu_s$, $\sigma_s$), as further indicated in FIG. 6. In some examples, this result can be achieved using a Product-of-Experts (PoE)-based consistency model or a Mixture-of-Experts (MoE)-based consistency model.

The decoder 520 of the DBVAE 500 includes two decoder portions, labeled $520_1$ and $520_2$, respectively. Each of the decoder portions $520_1$ and $520_2$ is implemented using a respective neural network and, as such, is referred to as the "NN decoder portion." The configurations of the NN decoder portions $520_1$ and $520_2$ are defined by the corresponding sets of weights and biases, denoted as $\phi_1$ and $\phi_2$, respectively. The NN decoder portion $520_1$ operates on the latent representations $z_{p1}$ and $z_s$. The NN decoder portion $520_2$ similarly operates on the latent representations $z_{p2}$ and $z_s$. An output of the NN decoder portion $520_1$ is a sub-vector $522_1$ corresponding to the first modality of the scientific instrument 100. An output of the NN decoder portion $520_2$ is a sub-vector $522_2$ corresponding to the second modality of the scientific instrument 100.

In some examples, the latent representations $z_{p1}$, $z_{p2}$, and $z_s$ are learned by training the DBVAE 500 on three different reconstruction tasks: (1) self-reconstruction, which includes encoding and decoding a single modality, such as $x_1 \rightarrow$ $\widetilde{x_1}$ and $x_2 \to \widetilde{x_2}$; (2) joint reconstruction, which includes encoding and decoding both modalities together, i.e., $(x_1, x_2) \to (\widetilde{x_1}, \widetilde{x_2})$; and (3) cross-reconstruction, which includes encoding one modality and decoding to the other modality, such as $x_1 \to \widetilde{x_2}$ and $x_2 \to \widetilde{x_1}$, where $\widetilde{x_1}$ and $\widetilde{x_2}$ denote the sub-vectors $522_1$ and $522_2$ (also see FIG. 6). Each of these reconstruction tasks is associated with its own term in the loss-function, and the full loss function $L(\theta, \phi)$ is a weighted sum of those terms, e.g., as expressed, in simplified form, by Eq. (4):

$$L(\theta, \phi) = \sum_{i=1}^{2} \sum_{j=1}^{3} \left( -\lambda_i E_{j,i} + \beta_j D_{j,i}^{(KL)} \right) \quad (4)$$

where the index i represents the two modalities; the index j represents the three reconstruction tasks indicated above; $E_{j,i}$ is the reconstruction loss corresponding to the j-th reconstruction task and the i-th modality; $D_{j,i}^{(KL)}$ is the Kullback-Leibler divergence corresponding to the j-th reconstruction task and the i-th modality; and $\lambda_i$, $\beta_j$ are the weights. Some specific examples of the loss function $L(\theta, \phi)$ expressed by Eq. (4) can be found, e.g., in the article by Mihee Lee and Vladimir Pavlovic, "Private-Shared Disentangled Multimodal VAE for Learning of Latent Representations," published in 2021 Proceedings of the IEEE/CVF conference on computer vision and pattern recognition (pp. 1692-1700), which is incorporated herein by reference in its entirety. Some embodiments may benefit from certain features described in the article by Yuge Shi, et al., entitled "Variational Mixture-of-Experts Autoencoders for Multi-Modal Deep Generative Models," published in the 33rd Conference on Neural Information Processing Systems (NeurIPS 2019), Vancouver, Canada, which article is incorporated herein by reference in its entirety.

In some examples, the DBVAE 500 is configured to use an eight-dimensional (8D) latent space. A Gaussian Mixture model (GMM) is used to classify this 8D latent space by clustering the latent space representations of a training dataset in a manner similar to that of the 2D example used for the above-described embodiment of the autoencoder 500 corresponding to a single modality of the scientific instrument 100. In particular, the above-mentioned BIC and AIC criteria are used to determine the number d of Gaussian distributions in the GMM.

For illustration purposes and without any implied limitations, additional embodiments are described herein below in reference to the EDS and EELS modalities of the scientific instrument 100. In some examples of such embodiments, the autoencoder 500 shown in FIG. 5 or FIG. 6 is configured to process experimental data corresponding to the data structure 300 (FIG. 3). From the description provided hereinbelow, a person of ordinary skill in the pertinent art will readily understand how to make and use other embodiments corresponding to other single modalities, other dual modalities, and/or various sets of multiple individual modalities of the scientific instrument 100 without any undue experimentation.

Example experimental data presented in FIGS. 7-12 and 16-17 and described in more detail below correspond to a microchip transistor made of various technological materials containing the elements C, N, O, Al, Si, Ti, Cu, Hf, Ta, and W. Example size of the corresponding STEM images, such as the STEM image 302, is 270×208 pixels. Example scale bars indicating the pixel sizes and the associated spatial resolution of such STEM images are presented in FIGS. 9B and 17A. In various examples, for each pixel of the STEM image, the corresponding data structure includes: (i) a respective EELS spectrum representing the EELS modality of the scientific instrument 100; (ii) a respective EDS spectrum representing the EDS modality of the scientific instrument 100; or (iii) both a respective EELS spectrum and a respective EDS spectrum representing the dual EDS+EELS modality of the scientific instrument 100. When the dual EDS+EELS modality is in effect, the EELS and EDS spectra corresponding to a pixel of the STEM image are recorded in parallel (e.g., substantially simultaneously) via the respective detectors, e.g., the EELS detector 260, 180 and the EDS detector 160 (also see FIG. 2). Due to different respective sensitivities of the EELS detector 260, 180 and the EDS detector 160, the acquired EELS and EDS spectra typically have different respective SNRs. Each of the acquired EELS spectra covers the energy range from about 200 eV to about 3300 eV, with an energy resolution of 1.5 eV. Each of the acquired EDS spectra covers the energy range from about 0 eV to about 20 keV, with an energy resolution of 5 eV. In at least some examples, the raw experimental data are preprocessed before being assembled into the corresponding data structure, such as the data structure 300 of FIG. 3, which is then presented for the processing implemented using the autoencoder 500.

Figure 7A:
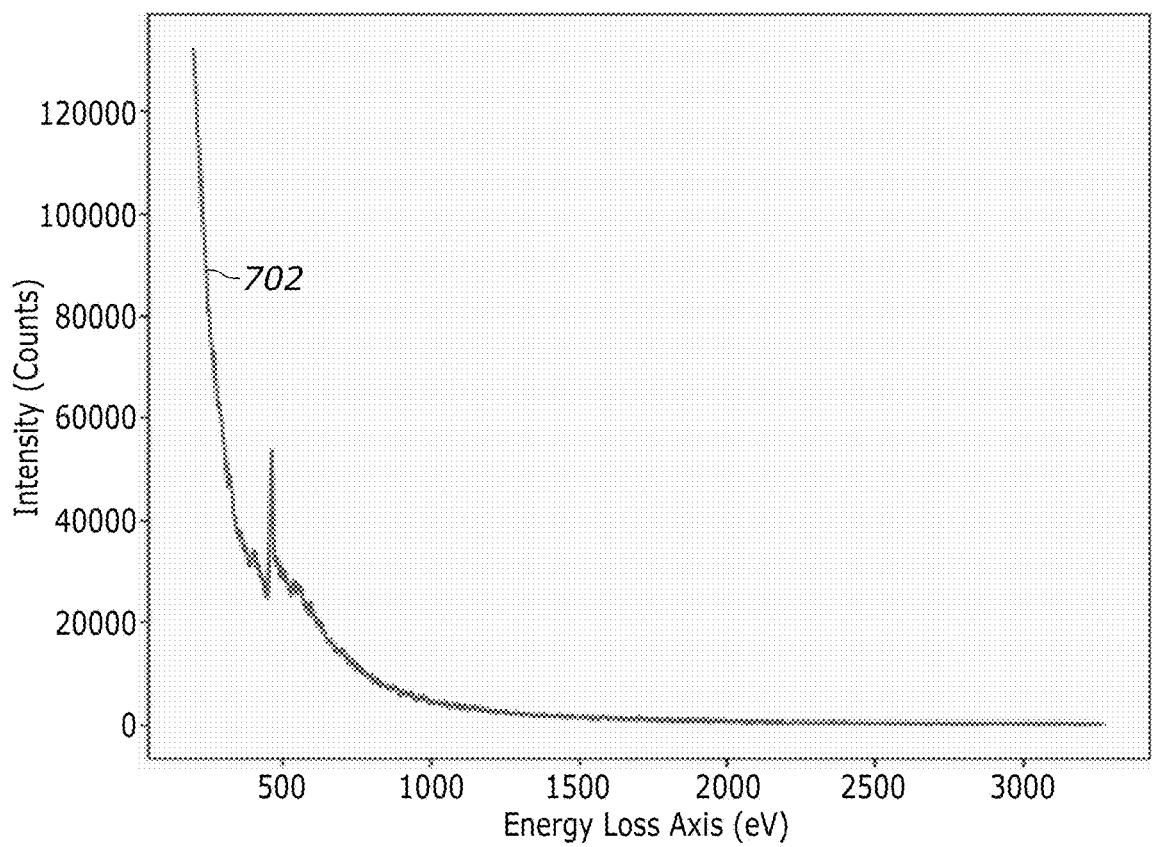
FIGS. 7A-7B graphically illustrate preliminary processing of Electron Energy Loss Spectroscopy (EELS) data acquired with the scientific instrument of FIG. 1, in accordance with one embodiment.
Figure 7B:
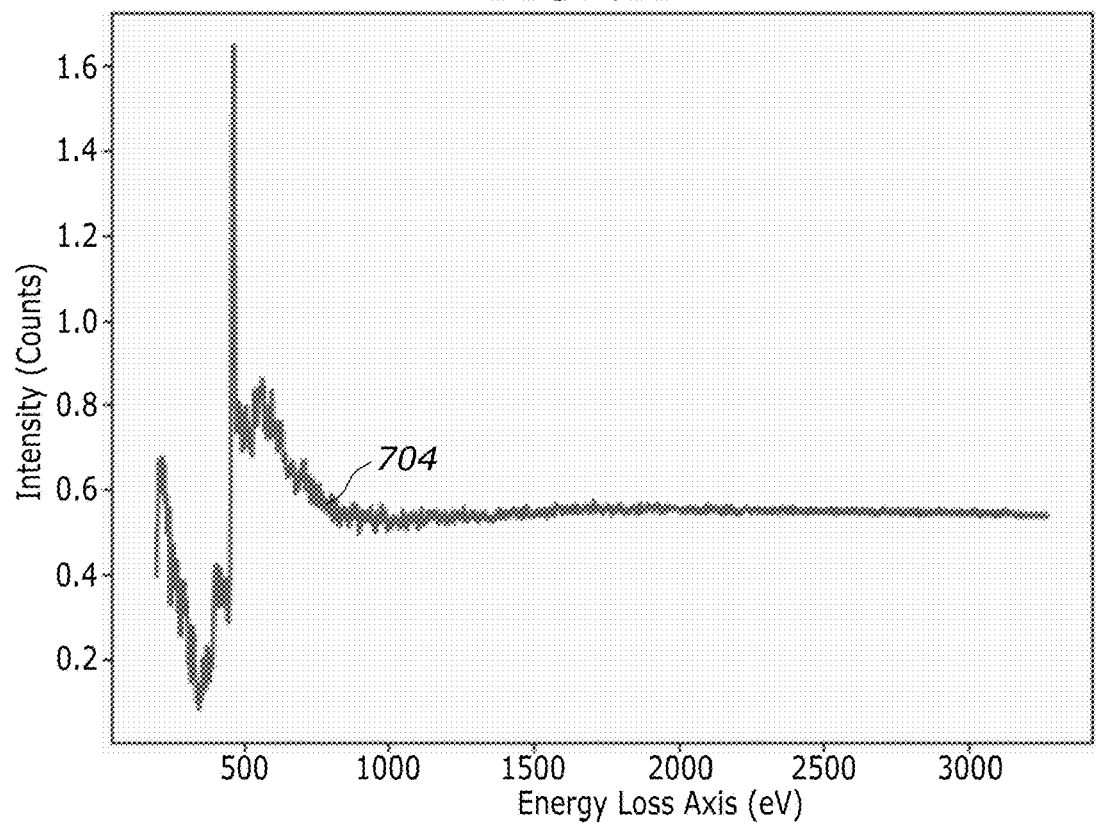

FIGS. 7A-7B graphically illustrate preliminary processing of EELS spectra acquired using the EELS detector 260, 180 in accordance with an example embodiment. More specifically, an EELS spectrum 702 shown in FIG. 7A is an example of an unprocessed (raw) EELS spectrum. An EELS spectrum 704 shown in FIG. 7B is an example of a preprocessed EELS spectrum generated by processing the EELS spectrum 702. In some examples, the data structure 300 of FIG. 3 contains preprocessed EELS spectra analogous to the EELS spectrum 704.

An unprocessed EELS spectrum, such as the EELS spectrum 702 shown in FIG. 7A, typically has one or both of two prominent features that do not contribute to the chemical information typically extracted from the EELS spectra. The first of the two prominent features is the strong energy-dependent background, the intensity of which decreases as the energy loss increases. The second of the two prominent features is an occasional presence of one or more outlier peaks caused by stray X-rays hitting the detector 180. Example preliminary processing is thus directed at removing these features from the EELS spectra. In some examples of preprocessing, the outlier peaks are removed first. Such peaks are substantially noise features that carry no useful physical or chemical information about the sample S while often obscuring some meaningful spectral features. During the preprocessing, each outlier peak is replaced by the mean values of the surrounding several (e.g., four) detector pixels. This outlier peak removal is followed by the subtraction of the estimated energy-dependent background.

The energy-dependent background is typically caused by the long tails of the lower-energy transition edges. The magnitude of the energy-dependent background may depend on the thickness and composition of the sample. In some examples, the energy-dependent background is approximated by fitting a powerlaw (or a sum of powerlaws) to a pre-edge region of the EELS spectrum (i.e., the part of the spectrum before the observed edge) and extrapolating this fit to other parts of the EELS spectrum. In some other examples, a different approach to the background removal is implemented. First, the EELS spectra are all scaled such that their energy-dependent backgrounds fit into the range between 0 and 1. This scaling is done by normalizing each EELS spectrum using the difference between the intensities corresponding to the first and last energy-loss values, which approximately represents the total range of the energy-dependent background. Next, the mean spectrum of the dataset is computed. A linear combination of five powerlaws expressed by Eq. (5) is then fitted to this mean spectrum:

$$b(E) = \sum_{r=1}^{5} c_r E^{-r} \quad (5)$$

where $c_r$ are coefficients; and E is the energy loss. The fitting is performed by adjusting the coefficients $c_r$ to minimize the least mean square (LMS) deviation. The resulting energy-dependent curve b(E) is then subtracted from each EELS spectrum of the dataset, thereby generating a corresponding set of EELS spectra 704.

Figure 8A:
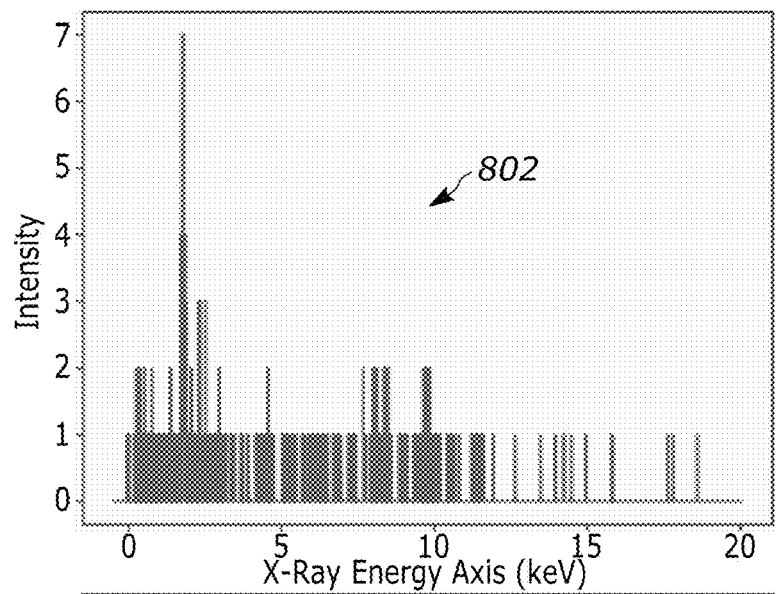
FIGS. 8A-8C graphically illustrate preliminary processing of Energy-Dispersive X-ray Spectroscopy (EDS) data acquired with the scientific instrument of FIG. 1, in accordance with another embodiment.
Figure 8B:
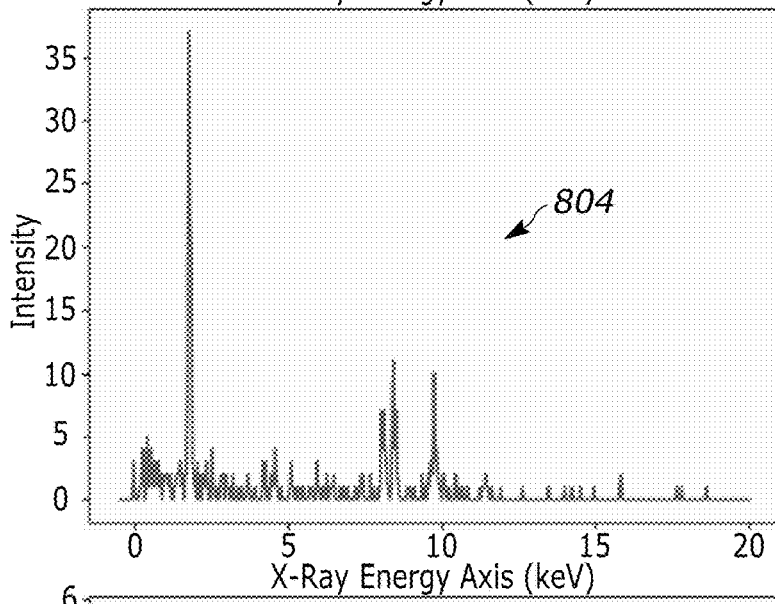
Figure 8C:
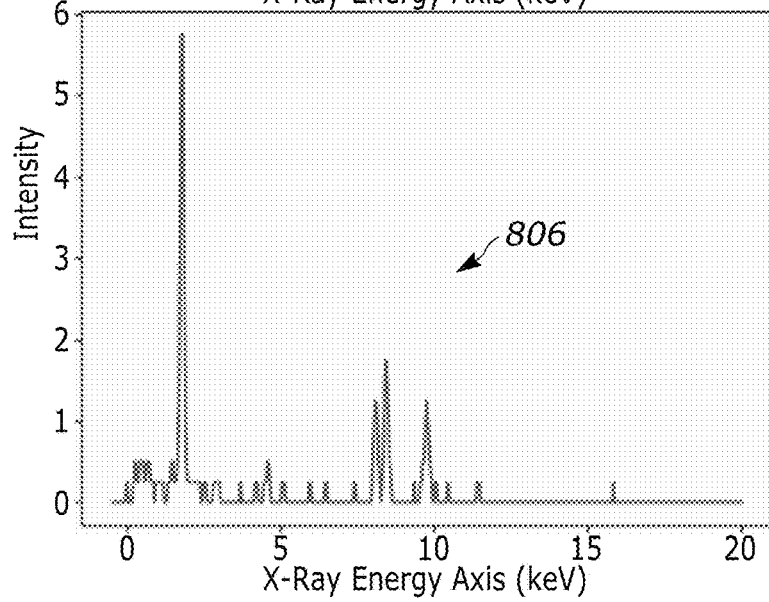

FIGS. 8A-8C graphically illustrate preliminary processing of EDS spectra acquired using the EDS detector 160, in accordance with an example embodiment. More specifically, an EDS spectrum 802 shown in FIG. 8A is an example of an unprocessed EDS spectrum. EDS spectra 804 and 806 shown in FIGS. 8B and 8C, respectively, graphically illustrate different operations of the preliminary processing as applied to the EDS spectrum 802.

In various examples, the preliminary processing operations include applying PCA to the acquired EDS spectra. The noise in unprocessed EDS spectra, such as the EDS spectrum 802, is typically dominated by the Poisson noise, the intensity of which varies depending on the number of counts in the EDS spectrum. This noise feature may cause the PCA by itself to be insufficient in at least some examples. As such, in some examples, binning and filtering operations are applied prior to the PCA. Since typical EDS spectra contain a relatively low number of counts, an unprocessed EDS spectrum, such as the EDS spectrum 802, is first re-binned along the energy axis, e.g., by a factor of eight to improve the SNR. The 8× re-binning reduces the energy resolution from 5 eV to 40 eV. In some examples, the re-binning is followed by Gaussian kernel filtering in the energy direction, with the standard deviation σ=1. In some examples, after the Gaussian kernel filtering, a background-subtraction operation is carried out. In some other examples, where the background level is sufficiently close to zero, the background-subtraction operation is omitted. Finally, the EDS spectra are normalized. The EDS spectrum 804 shown in FIG. 8B is obtained by the 8× re-binning of the EDS spectrum 802 of FIG. 8A. The EDS spectrum 806 shown in FIG. 8C is obtained from the EDS spectrum 802 of FIG. 8A after finishing all preliminary processing described above.

FIGS. 9-12 provide illustrative examples of autoencoder-based processing of various data sets generated with the scientific instrument 100 according to some embodiments. The data structure 300 described in reference to FIG. 3 is a representative non-limiting example of such data sets. Representative benefits of such autoencoder-based processing include, but are not limited to, enabling the corresponding scientific-instrument support system to: (i) identify and highlight, substantially in real time, the chemically similar areas within the sample S even when the corresponding detected signals exhibit a relatively low SNR; (ii) circumvent some conventional, time-intensive signal-processing methodologies to identify, substantially in real time, anomalous regions in the sample S; and (iii) provide improved signal-denoising capabilities to generate more-accurate signal estimates in a shorter time.

FIGS. 9A-9B illustrate a first example of autoencoder-based processing of a data structure generated with the scientific instrument 100 in accordance with an embodiment. This specific example corresponds to a single spectroscopic modality of the scientific instrument 100, with said single modality being the EELS modality. The corresponding data structure has: (i) a STEM image (e.g., similar to the STEM image 302, FIG. 3) of the above-mentioned transistor and (ii) for each pixel of the STEM image, a respective EELS spectrum (e.g., similar to the spectrum 704, FIG. 7B).

FIG. 9A shows a 2D latent space 900 of the autoencoder 500 (FIG. 5) trained, as described above, on EELS spectra of reference structures containing similar technological materials. The latent space 900 of the autoencoder 500 is classified into eight clusters 910-917 using GMMs, as described above. The number of clusters (d=8) is such that each of the clusters 910-917 has a relatively low element variance. The low element variance indicates that the chemical composition corresponding to a cluster is substantially homogeneous, e.g., representing approximately the same chemical elements in approximately the same amount across the whole latent-space cluster.

FIG. 9B shows the pixelated STEM image belonging to the corresponding data structure, wherein each pixel is mapped by the NN encoder 510 of the autoencoder 500 to a corresponding one of the clusters 910-917. The mapping is performed by: (i) feeding the EELS spectrum associated with the pixel of the STEM image into the encoder 510 to determine the corresponding latent representation, and (ii) identifying the corresponding one of the clusters 910-917 into which the determined latent representation falls. This mapping is indicated in FIG. 9B in accordance with the shown legend.

FIGS. 10A-10B illustrate a second example of autoencoder-based processing of a data structure generated with the scientific instrument 100 in accordance with an embodiment. This specific example corresponds to a single spectroscopic modality of the scientific instrument 100, with said single modality being the EDS modality. The corresponding data structure has: (i) a STEM image (e.g., similar to the STEM image 302, FIG. 3) of the above-mentioned transistor and (ii) for each pixel of the STEM image, a respective EDS spectrum (e.g., similar to the spectrum 806, FIG. 8C).

FIG. 10A illustrates a 2D latent space 1000 of the autoencoder 500 (FIG. 5) trained, as described above, on EDS spectra of reference structures containing similar technological materials. The latent space 1000 of the autoencoder 500 is classified into eight clusters 1010-1017 using GMMs, as described above. The number of clusters (d=8) is such that each of the clusters 1010-1017 has a relatively low element variance. As already mentioned above, the low element variance indicates that the chemical composition corresponding to a cluster is substantially homogeneous, e.g., representing approximately the same chemical elements in approximately the same amount across the whole cluster.

FIG. 10B shows the pixelated STEM image belonging to the corresponding data structure, wherein each pixel is mapped by the NN encoder 510 of the autoencoder 500 to a corresponding one of the clusters 1010-1017 based on the respective EDS spectrum. This mapping is indicated in FIG. 10B in accordance with the shown legend.

Figures 11A, 11B:
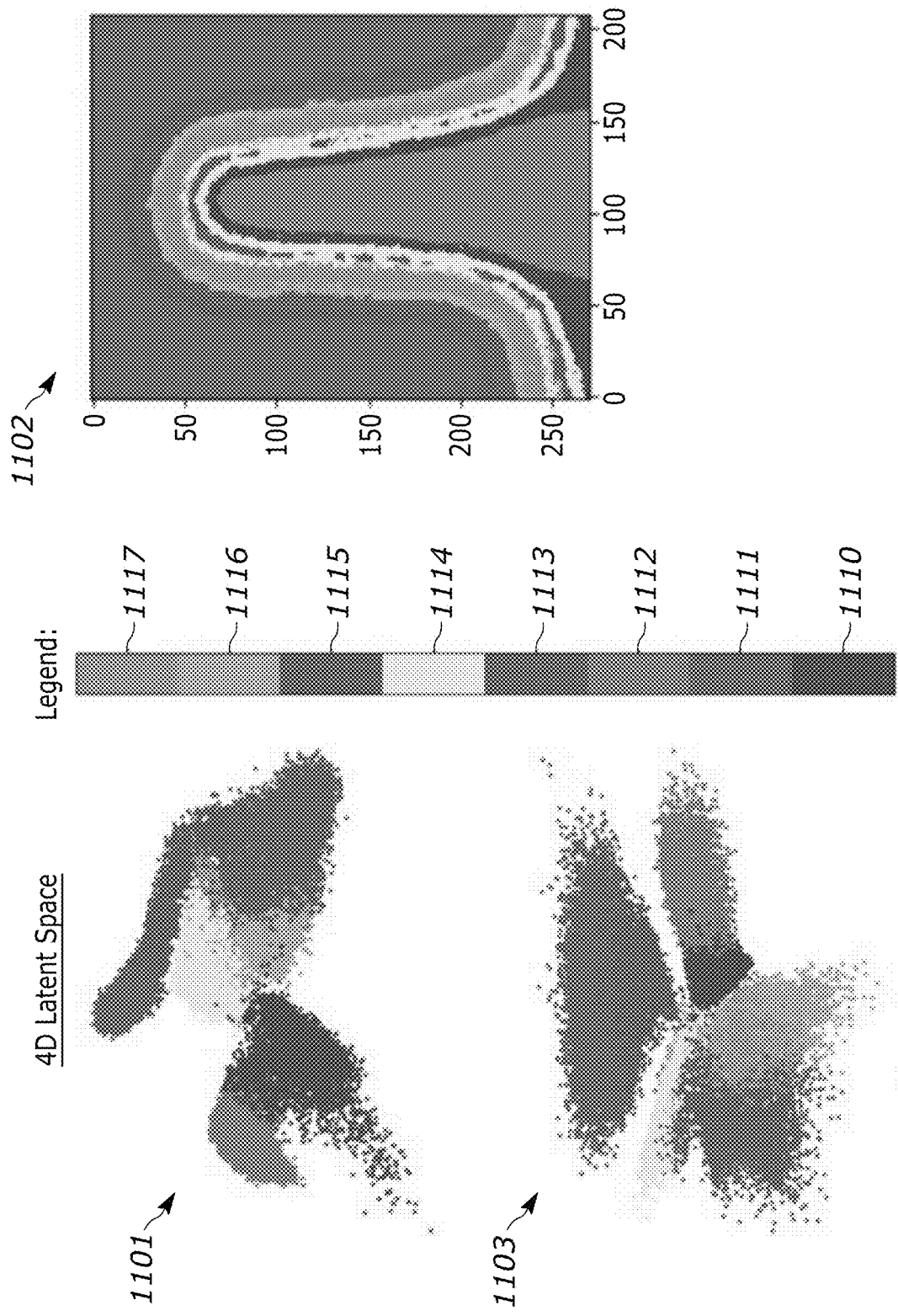
FIGS. 11A-11B illustrate a third example of autoencoder-based processing of experimental data generated with the scientific instrument of FIG. 1, in accordance with an embodiment.

FIGS. 11A-11B illustrate a third example of autoencoder-based processing of a data structure generated with the scientific instrument 100 in accordance with an embodiment. This specific example corresponds to a dual EELS+EDS modality of the scientific instrument 100. The corresponding data structure has: (i) a STEM image (e.g., similar to the STEM image 302, FIG. 3) of the above-mentioned transistor; (ii) for each pixel of the STEM image, a respective EELS spectrum (e.g., similar to the spectrum 704, FIG. 7B); and (iii) for each pixel of the STEM image, a respective EDS spectrum (e.g., similar to the spectrum 806, FIG. 8C).

FIG. 11A illustrates a 4D latent space of the autoencoder 500 (FIG. 5) produced by stacking, as described above, a 2D latent space corresponding to the EELS modality and a 2D latent space corresponding to the EELS modality of the scientific instrument 100. The corresponding 2D projections of this 4D latent space are labeled in FIG. 11A as 1101 and 1103, respectively. The 2D projection 1101 represents the EELS modality. The 2D projection 1103 represents the EDS modality. The 4D latent space corresponding to the 2D projections 1101 and 1103 is classified into eight clusters 1110-1117 using GMMs, as described above.

FIG. 11B shows the pixelated STEM image of the corresponding data structure, wherein each pixel is mapped by the NN encoder 510 of the autoencoder 500 to a corresponding one of the clusters 1110-1117 based on the respective EELS and EDS spectra. This mapping is indicated in FIG. 11B in accordance with the shown legend.

Figure 12:
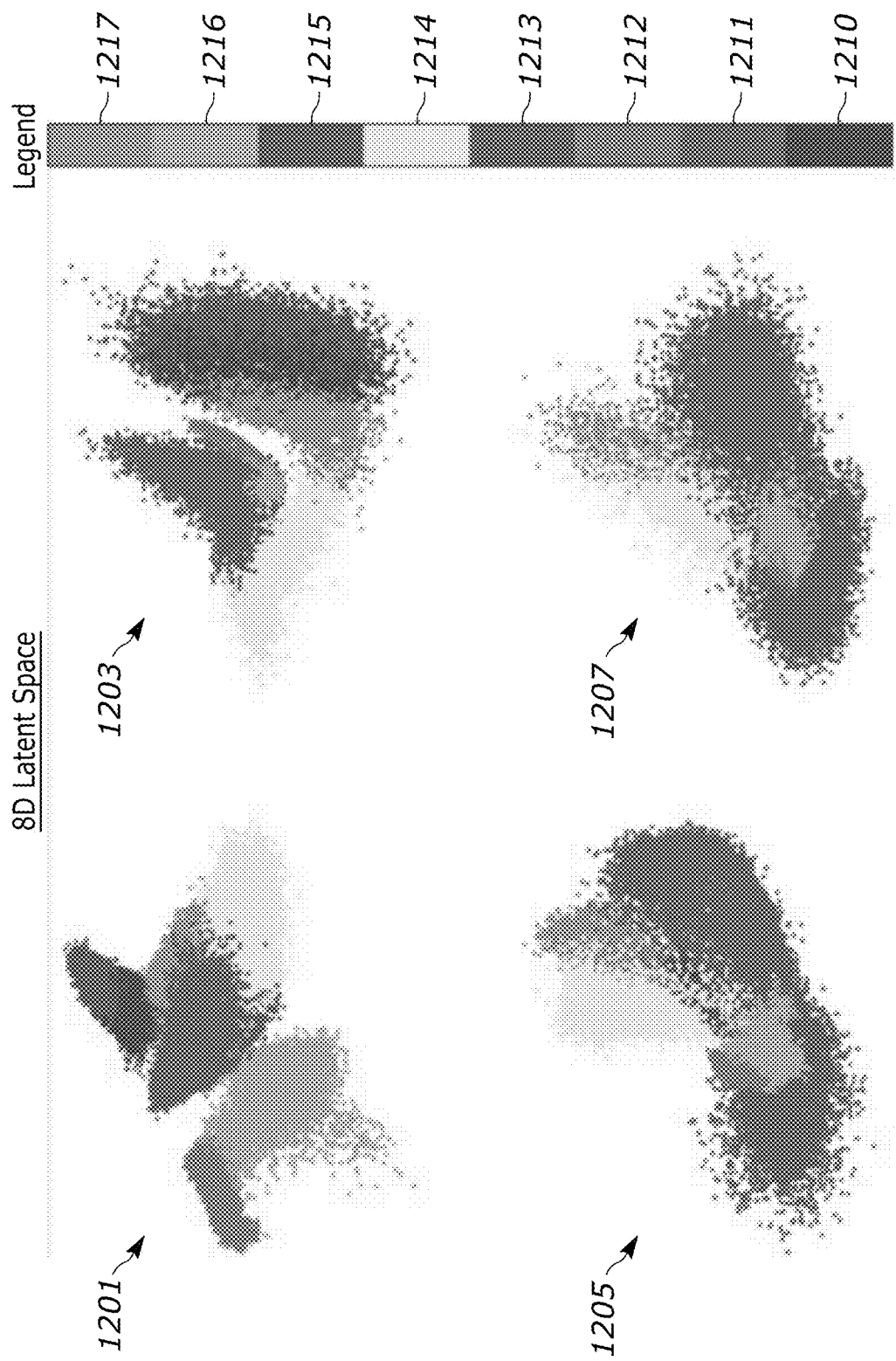
FIG. 12 graphically illustrates an eight-dimensional (8D) latent space of the autoencoder of FIG. 6 in accordance with an embodiment.

FIG. 12 illustrates an 8D latent space of the autoencoder 500 of FIG. 6, in accordance with an embodiment. This 8D latent space corresponds to the same dual EELS+EDS modality as that of FIGS. 11A-11B. As already mentioned above, the corresponding data structure has: (i) a STEM image (e.g., similar to the STEM image 302, FIG. 3) of the above-mentioned nano-transistor; (ii) for each pixel of the STEM image, a respective EELS spectrum (e.g., similar to the spectrum 704, FIG. 7B); and (iii) for each pixel of the STEM image, a respective EDS spectrum (e.g., similar to the spectrum 806, FIG. 8C).

The 8D latent space of the autoencoder 500 is illustrated in FIG. 12 by four orthogonal 2D projections thereof, which are labeled as 1201, 1203, 1205, and 1207, respectively. The 2D projection 1201 represents the private subspace $630_1$ of the EELS modality. The 2D projection 1203 represents the private subspace $630_2$ of the EDS modality. The 2D projections 1205 and 1207 represent the 4D shared subspace $630_0$ of the EELS and EDS modalities. This 8D latent space is classified into eight clusters 1210-1217 using GMMs, as described above. The pixelated STEM image of the corresponding data structure is mapped to the clusters 1210-1217 based on the respective EELS and EDS spectra. This cluster-mapped image is qualitatively similar to that of FIG. 11B and, as such, is not explicitly shown.

Figure 13:
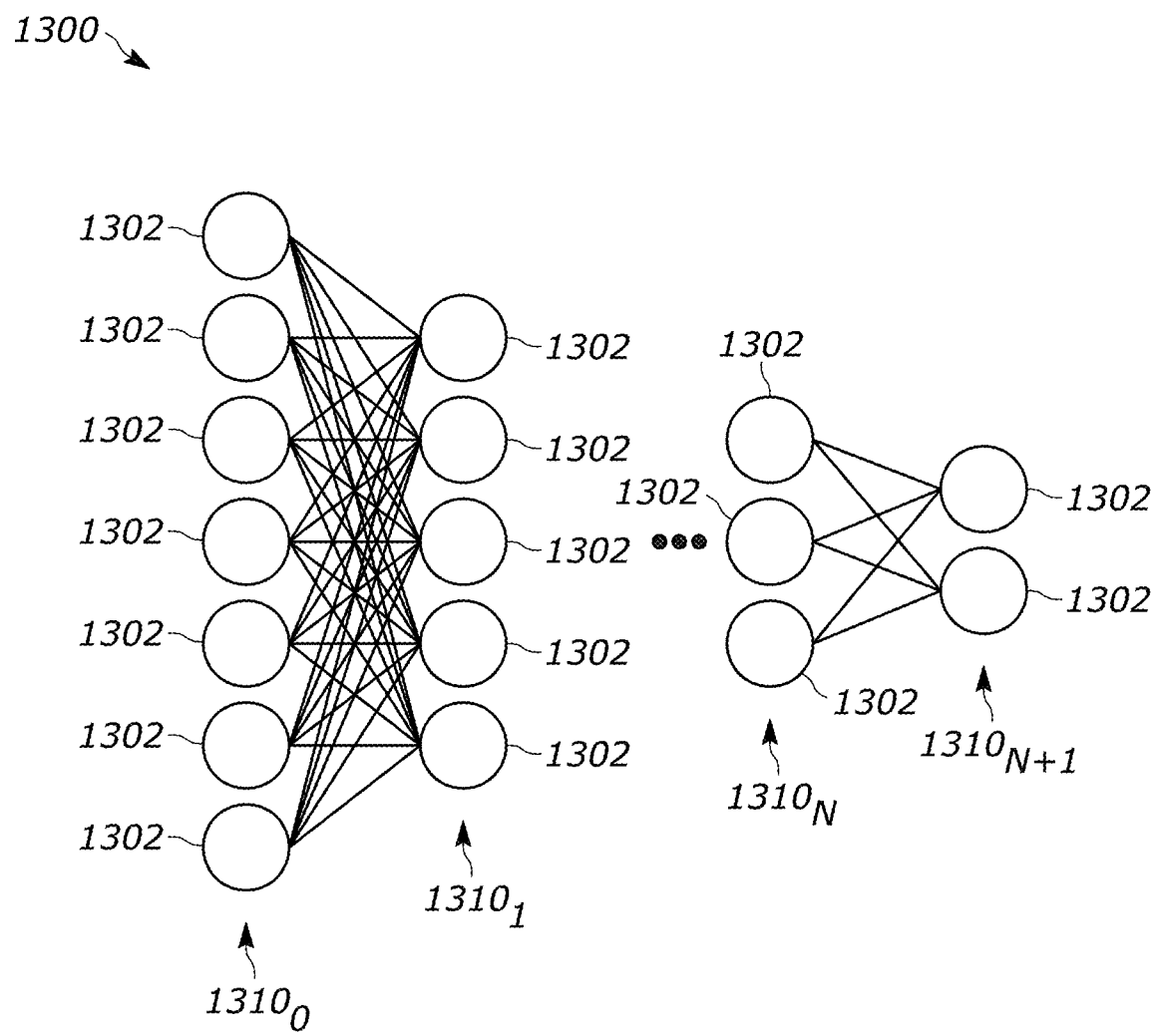
FIG. 13 is a block diagram illustrating a neural network used in the autoencoder of FIG. 5 or FIG. 6 in accordance with an embodiment.

FIG. 13 is a block diagram illustrating a neural network 1300 used in the NN encoder 510 in accordance with an embodiment. The neural network 1300 has (N+2) layers $1310_0$-$1310_{N+1}$, where N is a positive integer. The layer $1310_0$ is the input layer. The next N layers $1310_1$-$1310_N$ are the hidden layers. The layer $1310_{N+1}$ is the output layer. In some specific examples, the number N is in the range from 1 to 4. In various examples, the neural network 1300 implements the NN encoder 510 (FIG. 5), the NN encoder portion $510_1$ (FIG. 6), or the NN encoder portion $510_2$ (FIG. 6).

The i-th layer $1310_i$ of the neural network 1300 has $M_i$ PEs 1302, where i=0, 1, . . . , N+1. In various examples, the number $M_0$ of the PEs 1302 in the input layer $1310_0$ corresponds to the size of the input vector 502 (FIG. 5), the size of the input vector $502_1$ (FIG. 6), or the size of the input vector $502_2$ (FIG. 6). For some of the above-described specific examples corresponding to the EELS and EDS modalities of the scientific instrument 100, the number $M_0$ is in the range between 500 and 5000. The number $M_{N+1}$ of the PEs 1302 in the output layer $1310_{N+1}$ corresponds to the dimensionality of the latent space. The above-described examples of the autoencoder 500 have 2D, 4D, and 8D latent spaces. In other examples, latent spaces of other dimensionalities are also used. For each of the hidden layers $1310_1$-$1310_N$, the respective number $M_i$ is typically in the range between the number $M_0$ and the number $M_{N+1}$. In some examples, for two adjacent hidden layers $1310_i$ and $1310_{i+1}$, the respective numbers of PEs 1302 satisfy the following inequality: $M_i \geq M_{i+1}$. In one example, the neural network 1300 has the following parameters: N=3, $M_0$=512, $M_1=M_2=M_3$=125, and $M_4$=4.

In various examples, the Pes 1302 of the input layer $1310_0$ are configured to receive the corresponding components of the input vector 502, $502_1$, or $502_2$ (also see FIGS. 5-6). Each of the Pes 1302 of a subsequent layer 1310 is directly connected to receive respective inputs from each of the Pes 1302 of the preceding layer 1310. In some examples, various Pes 1302 operate using the Rectified Linear Unit (ReLU) activation function. In other examples, other suitable activation functions can also be used.

In some examples, a neural network used in the NN decoder 520 has an inverted topology but otherwise is similar to the neural network 1300. The inverted topology can be visualized by taking a mirror image of the neural network 1300 shown in FIG. 13. In such an inverted topology, the layer $1310_{N+1}$ operates as the input layer configured to receive the corresponding input vector 512 from the latent space. The layer $1310_0$ operates as the output layer configured to output the output vector 522, $522_1$, or $522_2$. Another way to visualize the neural network used in the NN decoder 520 is to view the neural network 1300, as shown in FIG. 13, with the signals flowing in the opposite direction, i.e., from the layer $1310_{N+1}$ to the layer $1310_0$.

Figure 14:
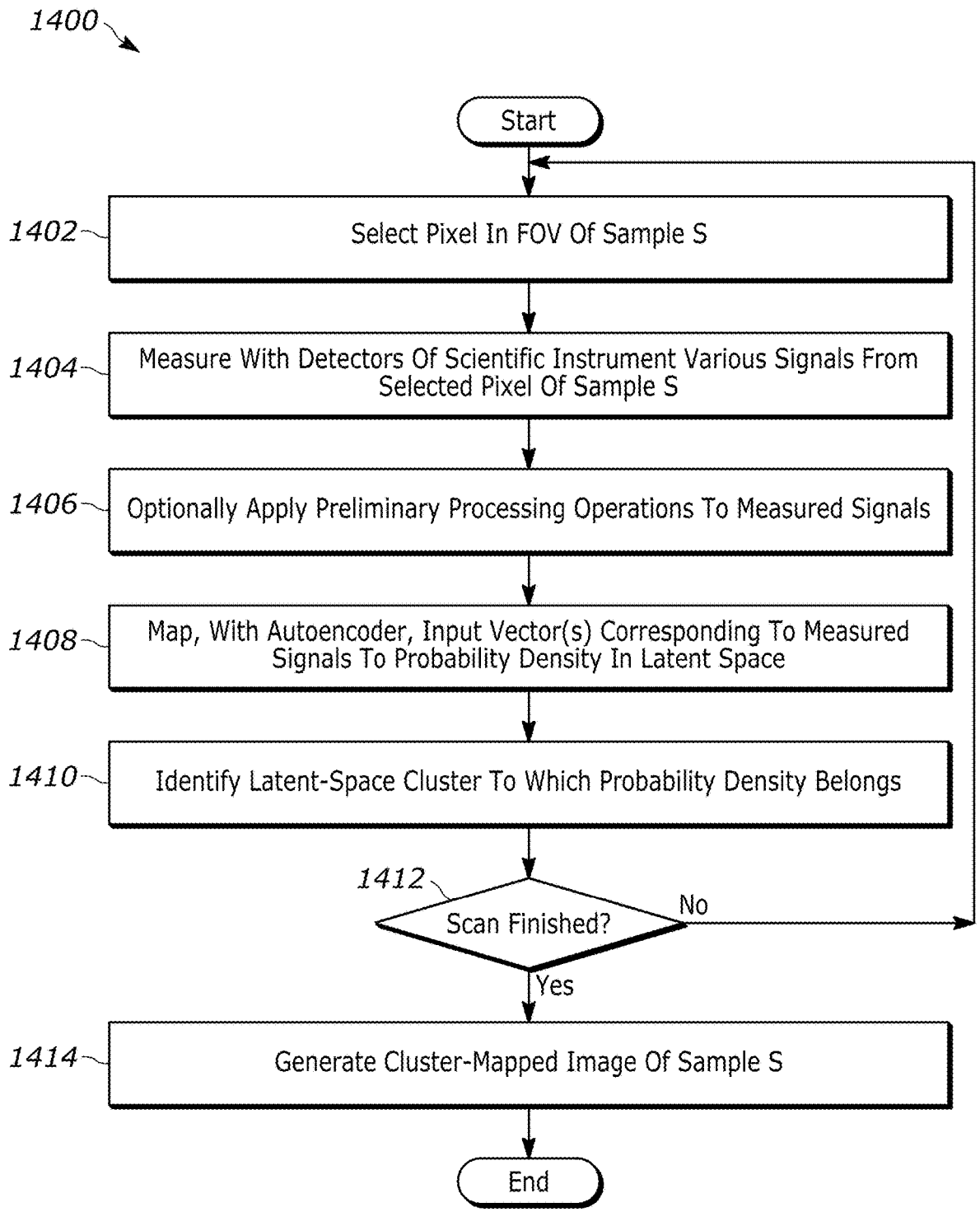
FIG. 14 is a flowchart illustrating an analytical method implemented using the scientific instrument of FIG. 1 in accordance with an embodiment.

FIG. 14 is a flowchart illustrating an analytical method 1400 implemented using the scientific instrument 100 in accordance with an embodiment. The analytical method 1400 relies on a previously trained autoencoder 500 to provide to the user of the scientific instrument 100, substantially in real time, chemical and structural information about the sample S based on measured spectra thereof. In various examples, the autoencoder 500 is trained, e.g., as described above, on the corresponding spectra of reference structures and/or samples containing materials similar to those of the sample S, and/or using numerically simulated data. For illustration purposes and without any implied limitations, the analytical method 1400 is described in reference to the STEM imaging modality. Based on the provided description, a person of ordinary skill in the pertinent art will readily understand how to adapt and apply the analytical method 1400 to other imaging modalities of the corresponding scientific instrument.

The analytical method 1400 includes selecting a pixel in the field of view (FOV) of the STEM column 102 of the scientific instrument 100 (in a block 1402). The pixel is selected in the block 1402 based on an applicable FOV scan pattern. In various examples, the FOV scan pattern is a raster scan pattern, a vector scan pattern, or any other suitable scan pattern based on which the electron beam 114 is steered by the deflection unit 118 and moves along a desired path across the sample S. As already indicated above, the beam steering is performed by the deflection unit 118 in response to the control signal 154 being applied thereto by the electronic controller 150.

The analytical method 1400 also includes measuring, with two or more detectors of the scientific instrument 100, various signals from the sample S (in a block 1404). In various examples, such various signals originate from a spot on the sample S corresponding to the pixel selected in the block 1402 and are produced in response to probing, stimulation, and/or excitation of that spot by the electron beam 114. In some examples, the two or more detectors of the scientific instrument 100 used in the block 1404 include at least one detector corresponding to an imaging modality of the scientific instrument 100 and at least one detector corresponding to a spectroscopic modality of the scientific instrument 100. In some other examples, the detectors used in the block 1404 include at least one detector corresponding to an imaging modality of the scientific instrument 100 and at least two detectors corresponding to two different spectroscopic modalities of the scientific instrument 100. In various examples, the detectors of the scientific instrument 100 used in the block 1404 are selected from the group consisting of a high-angle annular dark field detector (e.g., 220), a medium-angle annular dark field detector (e.g., 230), an annular bright field detector (e.g., 240), a segmented annular detector, a differential phase contrast detector, an EELS detector (e.g., 260/180), an EDS detector (e.g., 160), and a 2D pixelated diffraction-pattern detector. The streams of measurements generated by the two or more detectors of the scientific instrument 100 in the block 1404 are directed to the electronic controller 150 for processing therein.

The analytical method 1400 also includes the electronic controller 150 applying one or more optional preliminary processing operations to the received streams of measurements (in a block 1406). In various examples, the types of such preliminary processing operations depend on the types of detectors used in the block 1404. For example, for the EELS spectra measured with the EELS detector (e.g., 260, 180), the preliminary processing operations of the block 1406 may include, but are not limited to, processing operations selected from the group consisting of: (i) removal of outlier peaks; (ii) subtraction of estimated energy-dependent background; (iii) scaling; (iv) normalization; (v) averaging; and (vi) fitting with a selected function. For the EDS spectra measured with the EDS detector (e.g., 160), the preliminary processing operations of the block 1406 may include, but are not limited to, the processing operations selected from the group consisting of: (i) binning or re-binning; (ii) Gaussian kernel filtering; (iii) subtracting the estimated background; and (iv) normalization. Other types of measured spectra and/or signals typically cause the electronic controller 150 to invoke other suitable sets of preliminary processing operations in the block 1406. In some examples, some or all of the preliminary processing operations of the block 1406 are bypassed or omitted.

The analytical method 1400 also includes the electronic controller 150 applying one or more measured spectra and/or signals as the input vector(s), e.g., 502 or $502_1$, $502_2$, to the autoencoder 500 (in a block 1408). In some examples, such applied spectra and/or signals are the spectra and/or signals resulting from the preliminary processing operations of the block 1406. In some other examples (e.g., when the corresponding preliminary processing operations of the block 1406 are bypassed or omitted), such applied spectra and/or signals are unprocessed spectra and/or signals received form the detectors. In response to receiving such input vector(s), the encoder 510 of the autoencoder 500 operates, in the block 1408, to map the received input vector(s) to the corresponding (e.g., Gaussian) probability density in the latent space. In various examples, the latent space of the autoencoder 500 is a 2D space (e.g., see FIGS. 9A, 10A), a 4D space (e.g., see FIG. 11A), an 8D space (e.g., see FIG. 12), or other multidimensional space of suitable dimensionality k.

The analytical method 1400 also includes the electronic controller 150 identifying a corresponding latent-space cluster (in a block 1410). The cluster identification is performed in the block 1410 based on (i) the latent-space probability density to which the corresponding input vector(s) is (are) mapped by the encoder 510 of the autoencoder 500 in the block 1408 and (ii) the GMM-based classification of the latent space described above. In some examples, the cluster determination performed in the block 1410 uses an algorithm selected from the group consisting of a k-means algorithm, a GMM algorithm, and a DBSCAN algorithm.

The analytical method 1400 also includes the electronic controller 150 determining whether the intended scan of the sample S is finished (in a decision block 1412). When the electronic controller 150 determines that the scan is finished ("Yes" at the decision block 1412), operations of a block 1414 are performed. When the electronic controller 150 determines that the scan is not finished ("No" at the decision block 1412), the processing operations of the analytical method 1400 are looped back to the operations of the block 1402.

Operations of the block 1414 of the analytical method 1400 include the electronic controller 150 generating a cluster-mapped image of the sample S, wherein each pixel is mapped to a respective cluster of the latent space, which is identified in the corresponding instance of the block 1410. In some examples, operations directed at generating the cluster-mapped image of the sample S in the block 1414 include generating, e.g., in a conventional manner, a base image of the sample S using the detector signals corresponding to the active imaging modality of the scientific instrument 100. One example of the base image generated in this manner in the block 1414 is the STEM image 302 (FIG. 3). The operations directed at generating the cluster-mapped image of the sample S in the block 1414 also include modifying the base image of the sample S by overlaying thereon a visual representation of the pixel-to-cluster mapping determined in different instances of the block 1410 of the processing loop 1402-1412.

In some examples, the visual representation of the pixel-to-cluster mapping used in the block 1414 is based on color coding the different clusters of the latent space of the autoencoder 500 with different respective colors. Several examples of such color coding are provided by the legends shown in FIGS. 9-12. The operation of modifying the base image in the block 1414 in such examples includes coloring each pixel of the base image in accordance with the color code of the cluster to which the pixel is mapped in the corresponding instance of the block 1410. Several example cluster-mapped images of the sample S obtained in this manner are shown in FIGS. 9B, 10B, and 11B.

In some other examples, the visual representation of the pixel-to-cluster mapping used in the block 1414 is based on color mixing and/or assigning each latent-space coordinate a corresponding layer of a color image. Upon completing operations of the block 1414 the analytical method 1400 is terminated.

Figure 15:
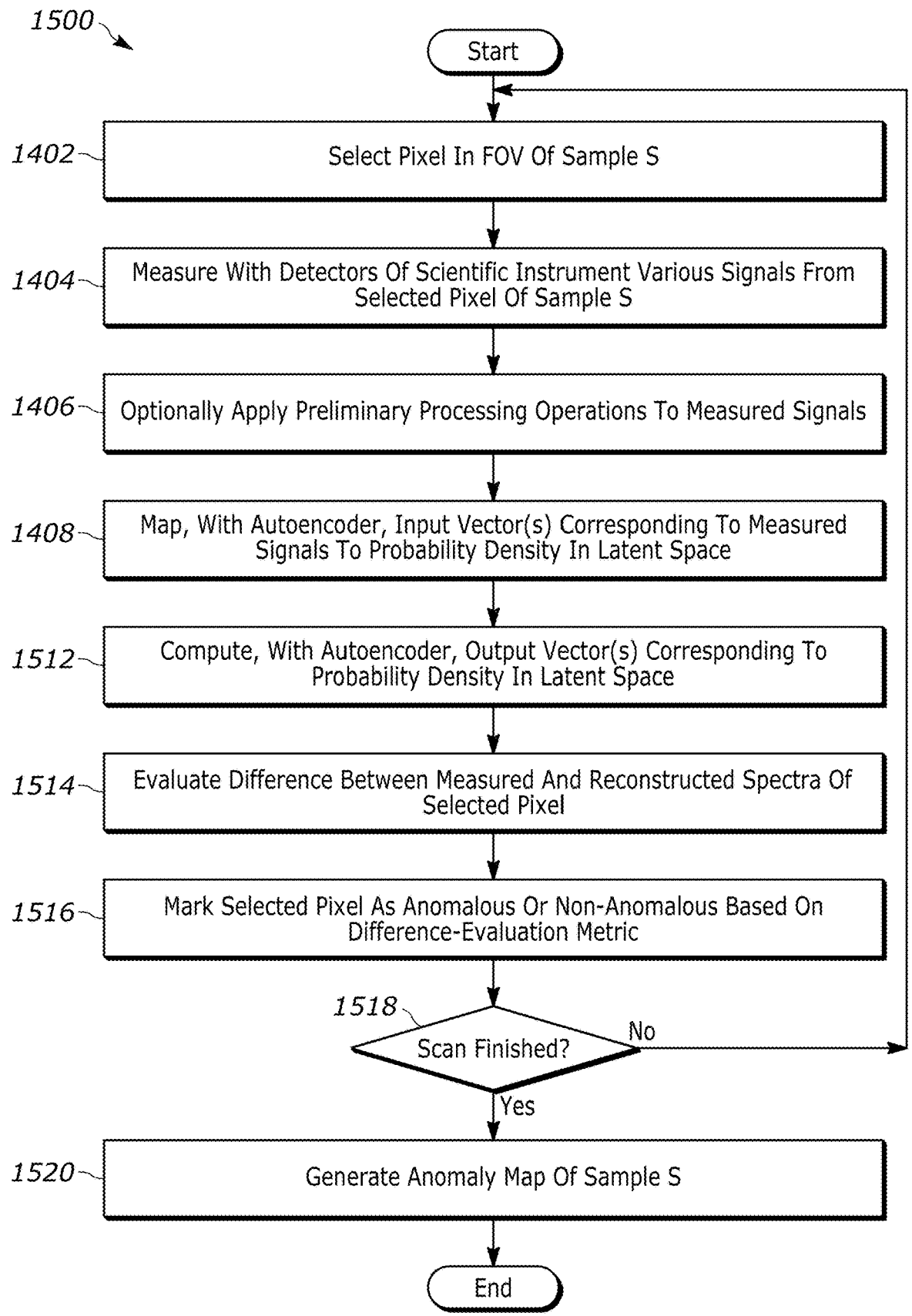
FIG. 15 is a flowchart illustrating another analytical method implemented using the scientific instrument of FIG. 1 in accordance with an embodiment.

FIG. 15 is a flowchart illustrating an analytical method 1500 implemented using the scientific instrument 100 in accordance with another embodiment. The analytical method 1500 relies on a previously trained autoencoder 500 to enable the user of the scientific instrument 100 to identify, substantially in real time, anomalous regions in the sample S for which the acquired spectra indicate significant and meaningful deviations from the expected sample characteristics. For example, the latent-space mapping and signal reconstruction performed with the autoencoder 500 provide metrics that are readily quantifiable to evaluate the magnitude of deviations and distinguish anomalous and non-anomalous regions even when the detected signals have a relatively low SNR. In quality-control procedures, the anomalous regions are of particular interest as potential technological problem spots. Based on the identification of such anomalous regions with the autoencoder 500, the user of the scientific instrument 100 can, for example, zoom in on specific anomalous regions in a next scan of the sample S for more detailed chemical and structural characterization thereof and/or take other suitable corrective actions. A significant benefit of the analytical method 1500 is that the trained autoencoder 500 can flag the anomalous regions in the sample S with very short signal-acquisition times (e.g., within seconds), thereby greatly expediting at least some quality-control procedures.

In various examples, the analytical method 1500 includes operations of the blocks 1402-1408 described above in reference to FIG. 14. For brevity, the description of those operations is not repeated here. The reader is referred to the pertinent portions of the description of the analytical method 1400 provided above for details on the operations performed in the blocks 1402-1408.

The analytical method 1500 further includes the autoencoder 500 generating the corresponding output vector(s), e.g., 522 or $522_1$, $522_2$ (in a block 1512). In some examples, operations of the block 1512 include: (i) computing the latent-space vector(s) 512 or 5121, 5122, $512_s$ by appropriately sampling the latent-space probability density to which the input vector(s) 502 or $502_1$, $502_2$ are mapped in the block 1408 of the analytical method 1500; and (ii) applying the computed latent-space vectors to the NN decoder 520 of the autoencoder 500 to generate the corresponding output vector(s) 522 or $522_1$, $522_2$ (also see FIGS. 5-6). As already indicated above, the output vector(s) 522 or $522_1$, $522_2$ contain(s) reconstructed spectra computed by the autoencoder 500 based on the measured spectra applied thereto as the input vector(s) 502 or $502_1$, $502_2$.

Upon completing operations of the block 1512, the electronic controller 150 has a corresponding reconstructed spectrum for each measured spectrum of the selected pixel, applied to the autoencoder 500. Accordingly, in various examples, upon completing operations of the block 1512, the electronic controller 150 has one or more pairs of measured/reconstructed spectra for the selected pixel. More specifically, for a single spectroscopic modality, the electronic controller 150 has a single pair of measured/reconstructed spectra for the selected pixel. For a dual spectroscopic modality, the electronic controller 150 has two pairs of measured/reconstructed spectra for the selected pixel, with each pair corresponding to a different respective individual single modality of the dual modality. For a plural spectroscopic modality (which includes three or more different spectroscopic modalities), the electronic controller 150 similarly has three or more pairs of measured/reconstructed spectra for the selected pixel.

Figure 16A:
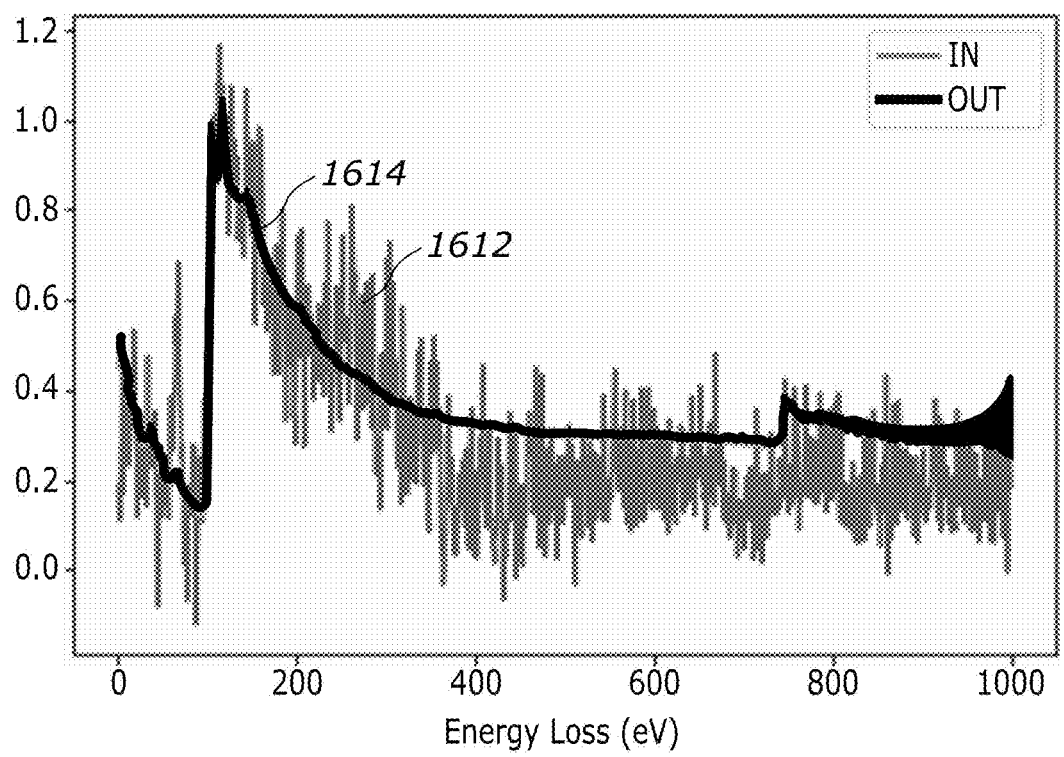
FIGS. 16A-16B are graphs illustrating example pairs of measured and reconstructed spectra used in the analytical method of FIG. 15 in accordance with an embodiment.
Figure 16B:
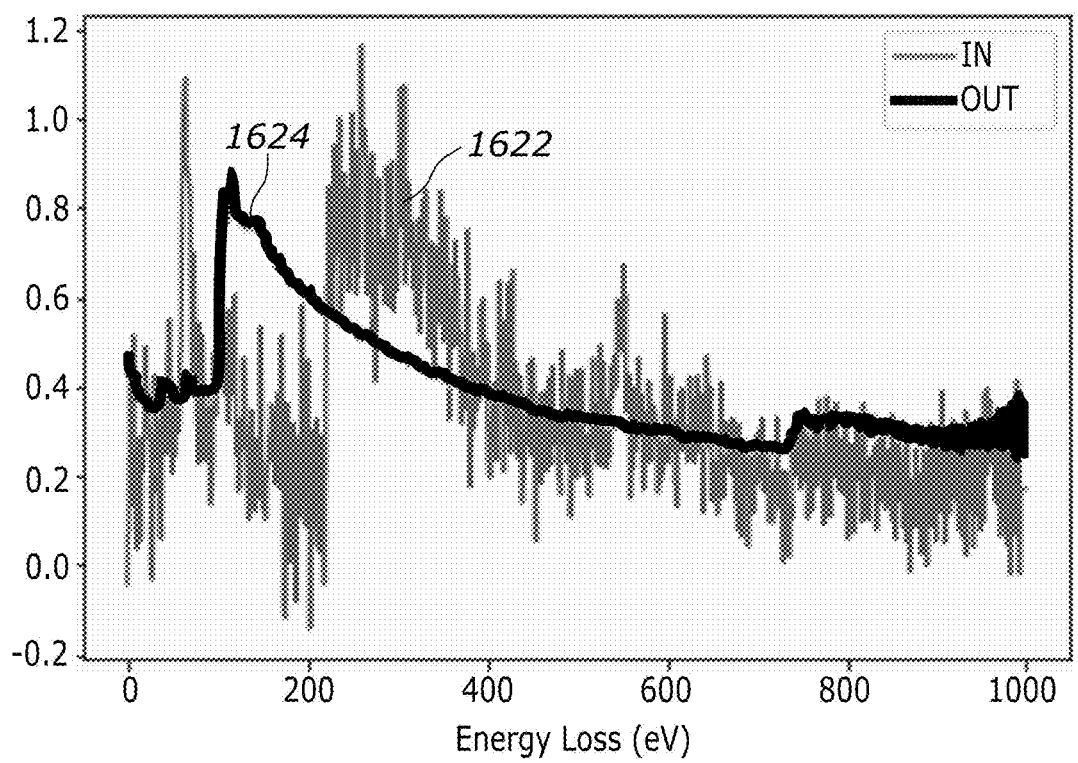

FIGS. 16A-16B are graphs illustrating example pairs of measured and reconstructed spectra for the EELS modality of the scientific instrument 100 in accordance with an embodiment. More specifically, FIG. 16A graphically shows a measured EELS spectrum 1612 and a corresponding reconstructed EELS spectrum 1614 for one selected pixel of the sample S. FIG. 16B graphically shows a measured EELS spectrum 1622 and a corresponding reconstructed EELS spectrum 1624 for another selected pixel of the sample S.

The EELS spectrum 1612 is measured by the EELS detector 260, 180 in one instance of the block 1404 of the analytical method 1500. The EELS spectrum 1614 is computed by the autoencoder 500 in the corresponding instance of the block 1512 of the analytical method 1500 in response to receiving the EELS spectrum 1612 in the input vector 502. The EELS spectrum 1622 is similarly measured by the EELS detector 260, 180 in another instance of the block 1404 of the analytical method 1500. The EELS spectrum 1624 is computed by the autoencoder 500 in the corresponding instance of the block 1512 of the analytical method 1500 in response to receiving the EELS spectrum 1622 in the input vector 502.

Referring back to FIG. 15, the analytical method 1500 also includes the electronic controller 150 evaluating the difference between the measured and reconstructed spectra of the pixel (in a block 1514). In some examples, the difference-evaluation metric used for this purpose in the block 1514 is based on the mean squared error (MSE). For example, for the measured/reconstructed EELS spectra 1612/1614 (FIG. 16A), the corresponding MSE value is approximately 0.02. For the measured/reconstructed EELS spectra 1622/1624 (FIG. 16B), the corresponding MSE value is approximately 0.05. In other examples, the difference-evaluation metric used in the block 1514 is based on other suitable loss functions. Examples of such other loss functions include the root-mean-square error (RMSE), mean absolute error (MAE), and Huber loss. In some examples, the electronic controller 150 can also use loss functions that detect outliers in the latent representation, with the term "outliers" referring to the points located far away from the corresponding clusters in the latent space.

In various examples, the difference-evaluation metric is computed in the block 1514 for a single spectroscopic modality, for a dual spectroscopic modality, or for a plural spectroscopic modality. In cases of a single spectroscopic modality, the difference-evaluation metric computed in the block 1514 is the same as the selected one of the loss functions, i.e., MSE, RMSE, MAE, or Huber loss. In cases of a dual or plural spectroscopic modality, the difference-evaluation metric used in the block 1514 is computed as a weighted sum of the loss functions corresponding to the constituent individual spectroscopic modalities of the dual or plural spectroscopic modality. For example, when the loss function is the MSE, the difference-evaluation metric (DEM) value is computed in the block 1514 as follows:

$$DEM = \sum_{q=1}^{Q} c_q MSE_q \qquad (6)$$

where Q is the total number of individual spectroscopic modalities; q is the modality index; $c_q$ is the weight corresponding to the q-th modality; and $MSE_q$ is the MSE value of the pair of measured/reconstructed spectra of the q-th modality. The weights $c_q$ are the algorithm parameters that are selected based on the types of the constituent individual modalities. For example, the weights $c_q$ may be optimally selected for the specific quality-control operation that is being carried out with the analytical method 1500. For a dual spectroscopic modality, the number Q is Q=2. The above-described EELS+EDS modality of the scientific instrument 100 is an example of the dual spectroscopic modality.

The analytical method 1500 also includes the electronic controller 150 marking the selected pixel of the sample S as anomalous or non-anomalous (in a block 1516). The marking is performed in the block 1516 based on the pixel's DEM value computed in the block 1514. More specifically, when the pixel's DEM value is smaller than a DEM threshold value (DEM$_0$), the pixel is marked as non-anomalous in the block 1516. When the pixel's DEM value is equal to or greater than the DEM threshold value, the pixel is marked as anomalous in the block 1516. In various examples, the DEM threshold value is an adjustable algorithm parameter the value of which is selected based on the specific quality-control operation and the micro/nano structure under inspection.

The analytical method 1500 also includes the electronic controller 150 determining whether the intended scan of the sample S is finished (in a decision block 1518). When the electronic controller 150 determines that the scan is finished ("Yes" at the decision block 1518), operations of a block 1520 are performed thereafter. When the electronic controller 150 determines that the scan is not finished ("No" at the decision block 1518), the processing operations of the analytical method 1500 are looped back to the operations of the block 1402.

Operations of the block 1520 of the analytical method 1500 include the electronic controller 150 generating an anomaly map of the sample S. In one example, the anomaly map is a black-and-white binary image of the sample S, wherein each non-anomalous pixel is black, and each anomalous pixel is white. In another example, the anomaly map is a grayscale image of the sample S, wherein each non-anomalous pixel is black, and each anomalous pixel is grayscale coded based on the difference between the pixel's DEM value computed in the block 1514 and the DEM threshold value. In yet another example, the anomaly map is a color image of the sample S, wherein each non-anomalous pixel is black, and each anomalous pixel is color coded based on the difference between the pixel's DEM value computed in the block 1514 and the DEM threshold value. Upon completing operations of the block 1520 the analytical method 1500 is terminated.

Figure 17A:
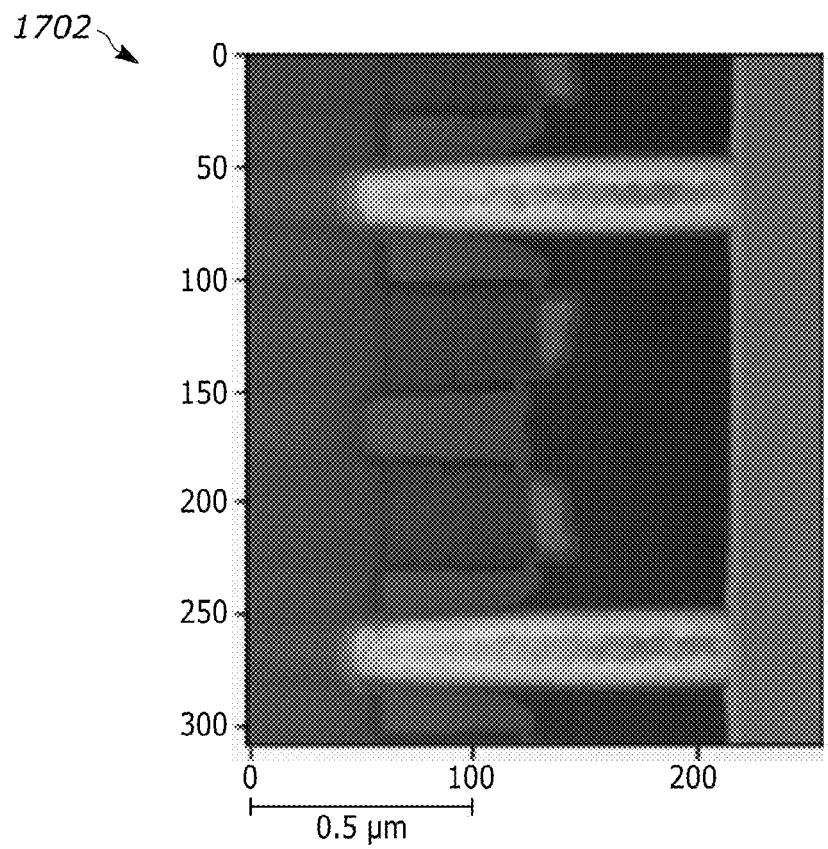
FIGS. 17A-17C illustrate example anomaly maps generated using the analytical method of FIG. 15 in accordance with an embodiment.
Figure 17B:
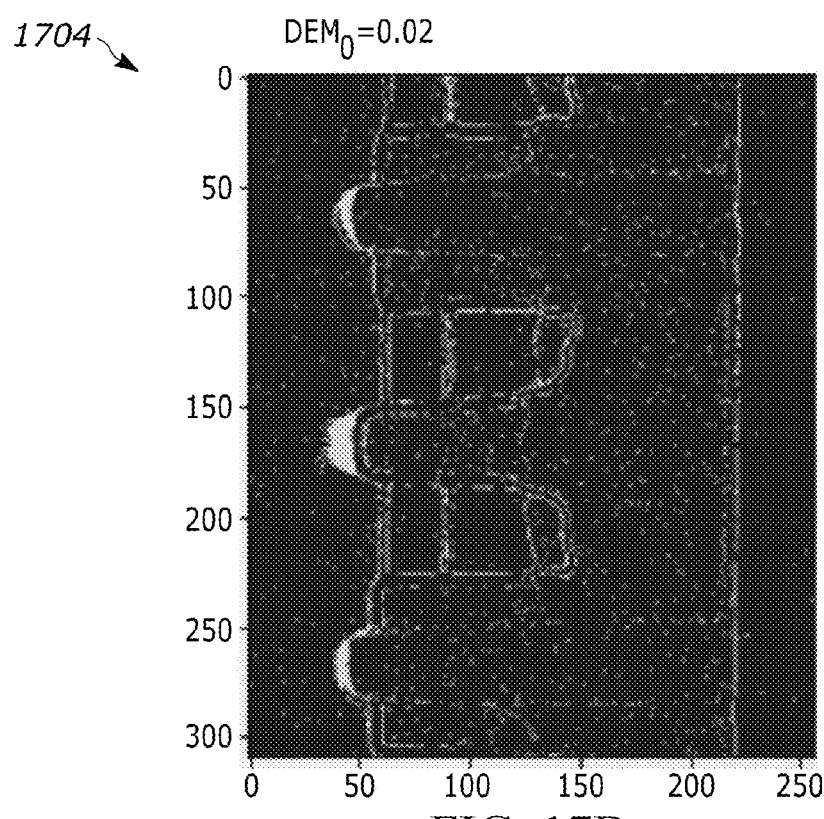
Figure 17C:
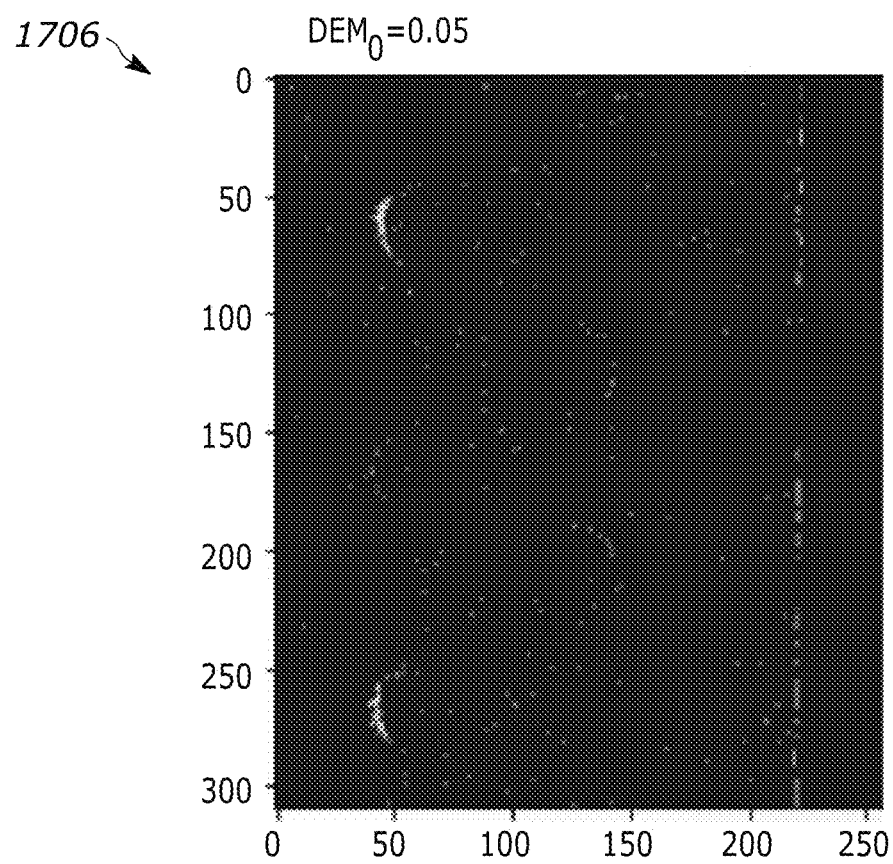

FIGS. 17A-17C illustrate example anomaly maps generated using the analytical method 1500 in accordance with an embodiment. In the example shown, the sample S includes a longitudinal cross section of a field-effect transistor (FET). FIG. 17A shows a STEM image 1702 of the sample S. FIG. 17B shows an anomaly map 1704 of the sample S generated with an embodiment of the analytical method 1500 corresponding to a single EELS modality, with the DEM threshold value being set to DEM$_0$=0.02. FIG. 17C shows an anomaly map 1706 of the sample S generated with the same embodiment of the analytical method 1500, but with the DEM threshold value being set to DEM$_0$=0.05. The pixel frame of the anomaly maps 1704, 1706 is the same as that of the STEM image 1702.

Comparison of the anomaly maps 1704, 1706 with the STEM image 1702 reveals that anomalous pixels are concentrated along various material interfaces of the FET structure. Due to the larger DEM threshold value used for the anomaly map 1706 than for the anomaly map 1704, the latter map has more pixels marked as anomalous. While small (e.g., thin) regions of varying chemical composition or valence state along the material interfaces is a normal and expected technological occurrence, proper (for example, empirical) selection of the DEM threshold value enables the quality inspection performed using the analytical method 1500 to quickly flag defective batches by showing a relatively large number of anomalous pixels in the interfacial layers and elsewhere. Oftentimes, the quality inspection is specifically focused on the interfacial layers of the nanostructure at hand, such as the FET of FIG. 17A, as those layers typically have a disproportionate influence on the properties of the nanostructure.

According to one example disclosed above, e.g., in the summary section and/or in reference to any one or any combination of some or all of FIGS. 1-17, provided is an apparatus comprising: an electron-beam column configured to scan an electron beam across a sample; a plurality of detectors configured to measure signals caused by interaction of the electron beam with the sample, the plurality of detectors including a first detector for a first modality and a second detector for an imaging modality; and an electronic controller connected to receive streams of measurements from the plurality of detectors and configured to: for each pixel of a base image of the sample generated using the imaging modality, map, with an autoencoder, a respective first input vector to a respective probability density in a latent space, with the respective first input vector and the base image being obtained based on the streams of measurements, the respective first input vector corresponding to the first modality; compute, with the autoencoder, a respective first output vector corresponding to the respective probability density; and generate an anomaly map of the sample based on respective differences corresponding to different pixels of the base image, each of the respective differences being a difference between the respective first input vector and the respective first output vector.

In some examples of the above apparatus, the plurality of detectors is selected from the group consisting of a high-angle annular dark field detector, a medium-angle annular dark field detector, an annular bright field detector, a segmented annular detector, a differential phase contrast detector, an Electron Energy Loss Spectroscopy (EELS) detector, an Energy-Dispersive X-ray Spectroscopy (EDS) detector, and a two-dimensional diffraction-pattern detector.

In some examples of any of the above apparatus, the first detector is an EELS detector or an EDS detector.

In some examples of any of the above apparatus, the autoencoder comprises: a neural network encoder configured to map the respective first input vector to the respective probability density in the latent space; and a neural network decoder configured to generate the respective first output vector based on the respective probability density, wherein the neural network encoder and the neural network decoder have been trained using a loss function, a set of training vectors, and a corresponding set of reconstructed training vectors, the loss function including a sum of a term representing reconstruction loss and a regularizer term.

In some examples of any of the above apparatus, the electronic controller is configured to evaluate a difference between the respective first input vector and the respective first output vector by computing a respective difference-evaluation metric (DEM) value based on mean squared error (MSE), root-mean-square error (RMSE), mean absolute error (MAE), outlier inspection, or Huber loss.

In some examples of any of the above apparatus, for each pixel of the base image, the electronic controller is configured to mark the pixel as being anomalous or non-anomalous based on a comparison of the respective DEM value with a DEM threshold value.

In some examples of any of the above apparatus, the anomaly map is a binary, grayscale, or color image of the sample, in which each non-anomalous pixel is black, and each anomalous pixel is white, grayscale-coded based on a difference between the respective DEM value and the DEM threshold value, or color-coded based on the difference between the respective DEM value and the DEM threshold value.

In some examples of any of the above apparatus, the plurality of detectors includes a third detector for a second modality; wherein the electronic controller is configured to: for each pixel of the base image, jointly map, with the autoencoder, the respective first input vector and a respective second input vector to the respective probability density in the latent space, with the respective second input vector corresponding to the second modality and being obtained based on the streams of measurements; and compute, with the autoencoder, a respective second output vector corresponding to the respective probability density, the first output vector corresponding to the first modality, the second output vector corresponding to the second modality.

In some examples of any of the above apparatus, the autoencoder comprises: a first neural network encoder configured to map the respective first input vector to a first probability density in a first private subspace of the latent space; and a second neural network encoder configured to map the respective second input vector to a second probability density in a second private subspace of the latent space, wherein the first neural network encoder and the second neural network encoder are further configured to jointly map the respective first input vector and the respective second input vector to the respective probability density in a shared subspace of the latent space.

In some examples of any of the above apparatus, each of the respective first input vector and the respective second input vector has a respective dimensionality in a range between 100 and 10000; and wherein the latent space is a two-dimensional space, a four-dimensional space, or an eight-dimensional space.

In some examples of any of the above apparatus, the electronic controller is configured to apply processing to the streams of measurements to obtain the respective first input vector, the processing including one or more operations selected from the group consisting of removal of outlier peaks, subtraction of an estimated background, scaling, normalization, averaging, fitting with a selected function, binning or re-binning, and Gaussian kernel filtering.

According to another example disclosed above, e.g., in the summary section and/or in reference to any one or any combination of some or all of FIGS. 1-17, provided is a support apparatus for a scientific instrument, the support apparatus comprising: an interface device configured to receive streams of measurements from a plurality of detectors of the scientific instrument, the plurality of detectors being configured to measure signals caused by interaction of an electron beam with a sample and including a first detector for a first modality of the scientific instrument and a second detector for an imaging modality of the scientific instrument; and a processing device configured to: for each pixel of a base image of the sample generated using the imaging modality, map, with an autoencoder, a respective first input vector to a respective probability density in a latent space, with the respective first input vector and the base image being obtained based on the streams of measurements, the respective first input vector corresponding to the first modality; compute, with the autoencoder, a respective first output vector corresponding to the respective probability density; and generate an anomaly map of the sample based on respective differences corresponding to different pixels of the base image, each of the respective differences being a difference between the respective first input vector and the respective first output vector.

In some examples of the above support apparatus, the plurality of detectors is selected from the group consisting of a high-angle annular dark field detector, a medium-angle annular dark field detector, an annular bright field detector, a segmented annular detector, a differential phase contrast detector, an Electron Energy Loss Spectroscopy (EELS) detector, an Energy-Dispersive X-ray Spectroscopy (EDS) detector, and a two-dimensional diffraction-pattern detector.

In some examples of any of the above support apparatus, the first detector is an EELS detector or an EDS detector.

In some examples of any of the above support apparatus, the autoencoder comprises: a neural network encoder configured to map the respective first input vector to the respective probability density in the latent space; and a neural network decoder configured to generate the respective first output vector based on the respective probability density; and wherein the neural network encoder and the neural network decoder have been trained using a loss function, a set of training vectors, and a corresponding set of reconstructed training vectors, the loss function including a sum of a term representing reconstruction loss and a regularizer term.

In some examples of any of the above support apparatus, the processing device is configured to evaluate a difference between the respective first input vector and the respective first output vector by computing a respective difference-evaluation metric (DEM) value based on mean squared error (MSE), root-mean-square error (RMSE), mean absolute error (MAE), outlier inspection, or Huber loss.

In some examples of any of the above support apparatus, for each pixel of the base image, the processing device is configured to mark the pixel as being anomalous or non-anomalous based on a comparison of the respective DEM value with a DEM threshold value.

In some examples of any of the above support apparatus, the anomaly map is a binary, grayscale, or color image of the sample, in which each non-anomalous pixel is black, and each anomalous pixel is white, grayscale-coded based on a difference between the respective DEM value and the DEM threshold value, or color-coded based on the difference between the respective DEM value and the DEM threshold value.

According to yet another example disclosed above, e.g., in the summary section and/or in reference to any one or any combination of some or all of FIGS. 1-17, provided is an automated method performed via a computing device for providing support to a scientific instrument, the method comprising: receiving streams of measurements from a plurality of detectors of the scientific instrument, the plurality of detectors being configured to measure signals caused by interaction of an electron beam with a sample and including a first detector for a first modality of the scientific instrument and a second detector for an imaging modality of the scientific instrument; for each pixel of a base image of the sample generated using the imaging modality, mapping, with an autoencoder, a respective first input vector to a respective probability density in a latent space, with the respective first input vector and the base image being obtained based on the streams of measurements, the respective first input vector corresponding to the first modality; computing, with the autoencoder, a respective first output vector corresponding to the respective probability density; and generating an anomaly map of the sample based on respective differences corresponding to different pixels of the base image, each of the respective differences being a difference between the respective first input vector and the respective first output vector.

It is to be understood that the above description is intended to be illustrative and not restrictive. Many implementations and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed subject matter incorporate more features than are expressly recited in each claim. Rather, as the following claims reflect, inventive subject matter lies in fewer than all features of a single disclosed example. Thus, the following claims are hereby incorporated into the Detailed Description, with each claim standing on its own as a separately claimed subject matter.

Unless explicitly stated otherwise, each numerical value and range should be interpreted as being approximate as if the word "about" or "approximately" preceded the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy or force is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus, comprising:
an electron-beam column configured to scan an electron beam across a sample for scanning transmission electron microscopy (STEM) imaging;
a plurality of detectors configured to measure signals caused by interaction of the electron beam with the sample, the plurality of detectors including a first detector for a first spectroscopic modality and a second detector for an a STEM imaging modality; and
an electronic controller connected to receive streams of measurements from the plurality of detectors and configured to:
for each pixel of a base image of the sample generated using the STEM imaging modality,
map, with an autoencoder, a respective first input vector to a respective probability density in a latent space, with the respective first input vector and the base image being obtained based on the streams of measurements, the respective first input vector representing a first spectrum acquired using the first spectroscopic modality; and
compute, with the autoencoder, a respective first output vector corresponding to the respective probability density and representing a second spectrum of the first spectroscopic modality; and
generate an anomaly map of the sample based on respective differences corresponding to different pixels of the base image, each of the respective differences being a difference between the respective first input vector and the respective first output vector.

2. The apparatus of claim 1, wherein the plurality of detectors is selected from the group consisting of a high-angle annular dark field detector, a medium-angle annular dark field detector, an annular bright field detector, a segmented annular detector, a differential phase contrast detector, an Electron Energy Loss Spectroscopy (EELS) detector, an Energy-Dispersive X-ray Spectroscopy (EDS) detector, and a two-dimensional diffraction-pattern detector.

3. The apparatus of claim 1, wherein the first detector is an EELS detector or an EDS detector.

4. The apparatus of claim 1, wherein the autoencoder comprises:
a neural network encoder configured to map the respective first input vector to the respective probability density in the latent space; and
a neural network decoder configured to generate the respective first output vector based on the respective probability density; and
wherein the neural network encoder and the neural network decoder have been trained using a loss function, a set of training vectors, and a corresponding set of reconstructed training vectors, the loss function including a sum of a term representing reconstruction loss and a regularizer term.

5. The apparatus of claim 1, wherein the electronic controller is configured to evaluate a difference between the respective first input vector and the respective first output vector by computing a respective difference-evaluation metric (DEM) value based on mean squared error (MSE), root-mean-square error (RMSE), mean absolute error (MAE), outlier inspection, or Huber loss.

6. The apparatus of claim 5, wherein, for each pixel of the base image, the electronic controller is configured to mark the pixel as being anomalous or non-anomalous based on a comparison of the respective DEM value with a DEM threshold value.

7. The apparatus of claim 6, wherein the anomaly map is a binary, grayscale, or color image of the sample, in which each non-anomalous pixel is black, and each anomalous pixel is white, grayscale-coded based on a difference between the respective DEM value and the DEM threshold value, or color-coded based on the difference between the respective DEM value and the DEM threshold value.

8. The apparatus of claim 1,
wherein the plurality of detectors includes a third detector for a second spectroscopic modality;
wherein the electronic controller is configured to:
for each pixel of the base image, jointly map, with the autoencoder, the respective first input vector and a respective second input vector to the respective probability density in the latent space, with the respective second input vector representing a third spectrum acquired using the second spectroscopic modality and being obtained based on the streams of measurements; and
compute, with the autoencoder, a respective second output vector corresponding to the respective probability density, the first output vector corresponding to the first spectroscopic modality, the second output vector corresponding to the second spectroscopic modality.

9. The apparatus of claim 8, wherein the autoencoder comprises:
a first neural network encoder configured to map the respective first input vector to a first probability density in a first private subspace of the latent space; and
a second neural network encoder configured to map the respective second input vector to a second probability density in a second private subspace of the latent space; and
wherein the first neural network encoder and the second neural network encoder are further configured to jointly map the respective first input vector and the respective second input vector to the respective probability density in a shared subspace of the latent space.

10. The apparatus of claim 9,
wherein each of the respective first input vector and the respective second input vector has a respective dimensionality in a range between 100 and 10000; and
wherein the latent space is a two-dimensional space, a four-dimensional space, or an eight-dimensional space.

11. The apparatus of claim 1, wherein the electronic controller is configured to apply processing to the streams of measurements to obtain the respective first input vector, the processing including one or more operations selected from the group consisting of removal of outlier peaks, subtraction of an estimated background, scaling, normalization, averaging, fitting with a selected function, binning or re-binning, and Gaussian kernel filtering.

12. A support apparatus for a scientific instrument, the support apparatus comprising:
an interface device configured to receive streams of measurements from the scientific instrument, wherein the scientific instrument comprises an electron-beam column configured to scan an electron beam across a sample for scanning transmission electron microscopy (STEM) imaging and further comprises a plurality of detectors configured to measure signals caused by interaction of the electron beam with the sample and including a first detector for a first spectroscopic modality of the scientific instrument and a second detector for a STEM imaging modality of the scientific instrument; and a processing device configured to:
for each pixel of a base image of the sample generated using the imaging modality,
map, with an autoencoder, a respective first input vector to a respective probability density in a latent space, with the respective first input vector and the base image being obtained based on the streams of measurements, the respective first input vector representing a first spectrum acquired using the first spectroscopic modality; and
compute, with the autoencoder, a respective first output vector corresponding to the respective probability density and representing a second spectrum of the first spectroscopic modality; and
generate an anomaly map of the sample based on respective differences corresponding to different pixels of the base image, each of the respective differences being a difference between the respective first input vector and the respective first output vector.

13. The support apparatus of claim 12, wherein the plurality of detectors is selected from the group consisting of a high-angle annular dark field detector, a medium-angle annular dark field detector, an annular bright field detector, a segmented annular detector, a differential phase contrast detector, an Electron Energy Loss Spectroscopy (EELS) detector, an Energy-Dispersive X-ray Spectroscopy (EDS) detector, and a two-dimensional diffraction-pattern detector.

14. The support apparatus of claim 12, wherein the first detector is an EELS detector or an EDS detector.

15. The support apparatus of claim 12, wherein the autoencoder comprises:
a neural network encoder configured to map the respective first input vector to the respective probability density in the latent space; and
a neural network decoder configured to generate the respective first output vector based on the respective probability density; and
wherein the neural network encoder and the neural network decoder have been trained using a loss function, a set of training vectors, and a corresponding set of reconstructed training vectors, the loss function including a sum of a term representing reconstruction loss and a regularizer term.

16. The support apparatus of claim 12, wherein the processing device is configured to evaluate a difference between the respective first input vector and the respective first output vector by computing a respective difference-evaluation metric (DEM) value based on mean squared error (MSE), root-mean-square error (RMSE), mean absolute error (MAE), outlier inspection, or Huber loss.

17. The support apparatus of claim 16, wherein, for each pixel of the base image, the processing device is configured to mark the pixel as being anomalous or non-anomalous based on a comparison of the respective DEM value with a DEM threshold value.

18. The support apparatus of claim 17, wherein the anomaly map is a binary, grayscale, or color image of the sample, in which each non-anomalous pixel is black, and each anomalous pixel is white, grayscale-coded based on a difference between the respective DEM value and the DEM threshold value, or color-coded based on the difference between the respective DEM value and the DEM threshold value.

19. An automated method performed via a computing device for providing support to a scientific instrument, the method comprising:
receiving streams of measurements from the scientific instrument, wherein the scientific instrument comprises an electron-beam column configured to scan an electron beam across a sample for scanning transmission electron microscopy (STEM) imaging and further comprises a plurality of detectors configured to measure signals caused by interaction of the electron beam with the sample and including a first detector for a first spectroscopic modality of the scientific instrument and a second detector for a STEM imaging modality of the scientific instrument;
for each pixel of a base image of the sample generated using the imaging modality,
mapping, with an autoencoder, a respective first input vector to a respective probability density in a latent space, with the respective first input vector and the base image being obtained based on the streams of measurements, the respective first input vector representing a first spectrum acquired using the first spectroscopic modality; and
computing, with the autoencoder, a respective first output vector corresponding to the respective probability density and representing a second spectrum of the first spectroscopic modality; and
generating an anomaly map of the sample based on respective differences corresponding to different pixels of the base image, each of the respective differences being a difference between the respective first input vector and the respective first output vector.

20. A non-transitory computer-readable medium storing instructions that, when executed by a computing device, cause the computing device to perform operations comprising the method of claim 19.

* * * * *